(12) United States Patent
Hiromatsu et al.

(10) Patent No.: US 11,219,830 B2
(45) Date of Patent: Jan. 11, 2022

(54) STORAGE MEDIUM, GAME SYSTEM, GAME APPARATUS AND GAME CONTROLLING METHOD

(71) Applicant: NINTENDO CO., LTD., Kyoto (JP)

(72) Inventors: Kotaro Hiromatsu, Kyoto (JP); Yoshihiko Ito, Kyoto (JP); Koji Takahashi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 15 days.

(21) Appl. No.: 16/731,185

(22) Filed: Dec. 31, 2019

(65) Prior Publication Data

US 2020/0376382 A1 Dec. 3, 2020

(30) Foreign Application Priority Data

May 29, 2019 (JP) .............................. JP2019-100479

(51) Int. Cl.
*A63F 13/57* (2014.01)
*A63F 13/63* (2014.01)
*A63F 13/818* (2014.01)

(52) U.S. Cl.
CPC .............. *A63F 13/57* (2014.09); *A63F 13/63* (2014.09); *A63F 13/818* (2014.09); *A63F 2250/0414* (2013.01); *A63F 2300/663* (2013.01)

(58) Field of Classification Search
CPC ........ A63F 13/57; A63F 13/63; A63F 13/818; A63F 2250/0414; A63F 2300/663

USPC .......................................................... 463/31
See application file for complete search history.

(56) References Cited

U.S. PATENT DOCUMENTS

| 7,695,367 | B2* | 4/2010 | Moro ...................... A63F 13/10 463/37 |
| 2006/0003832 | A1* | 1/2006 | Mincey ............... G07F 17/3267 463/25 |
| 2006/0258444 | A1 | 11/2006 | Nogami et al. |
| 2007/0265053 | A1* | 11/2007 | Linard .................... A63F 13/00 463/16 |
| 2014/0080558 | A1* | 3/2014 | Knutsson ................ A63F 13/40 463/10 |

FOREIGN PATENT DOCUMENTS

JP 2006-314633 11/2006

* cited by examiner

*Primary Examiner* — Allen Chan
(74) *Attorney, Agent, or Firm* — Nixon & Vanderhye, P.C.

(57) ABSTRACT

A non-limiting example game system comprises a processor incorporated in a main body apparatus, and the processor causes a player character to dig the ground based on an operation input of a player, thereby to form a hole. Water is placed in the hole, whereby a water place is formed. A shape of the water place is changed by expanding the hole, and when the water place has a long shape, the water is controlled so as to flow. When the water place is not a long shape, the water does not flow. That is, a river or a pond is formed in a game field based on an operation input of the player. When causing a player character to perform fishing based on an operation input of the player, different processing is executed between the river and the pond.

22 Claims, 27 Drawing Sheets

FLOW CALCULATION

FLOW CALCULATION

FLOW CALCULATION

FIG. 20A

DISTANCE MAP WITH RESPECT TO START POINT

START POINT

| 0 | 0 | 0 |   |   |   |   |   |
|---|---|---|---|---|---|---|---|
| 1 | 1 | 1 |   |   |   |   |   |
| 2 | 2 | 2 | 3 |   | 7 | 8 |   |
| 3 | 3 | 3 | 4 | 5 | 6 | 7 | 8 |
| 4 | 4 | 4 | 5 | 6 | 7 | 8 | 9 |
| 5 | 5 |   |   | 7 | 8 |   |   |
|   |   |   |   | 8 | 9 |   |   |

FIG. 20B

INITIAL VALUE OF FLOW WITH RESPECT TO START POINT

START POINT

| 0↓ | 0↓ | 0↓ |   |   |   |   |   |
|----|----|----|---|---|---|---|---|
| 1↓ | 1↓ | 1↓ |   |   |   |   |   |
| 2↓ | 2↓ | 2→ | 3↓ |   | 7→ | 8↑ |   |
| 3↓ | 3↓ | 3→ | 4→ | 5→ | 6→ | 7↓ | 8↓ |
| 4↓ | 4↓ | 4→ | 5→ | 6→ | 7→ | 8→ | 9 |
| 5 | 5 |   |   | 7→ | 8↓ |   |   |
|   |   |   |   | 8→ | 9 |   |   |

FIG. 21A

DISTANCE MAP WITH RESPECT TO END POINT

| 5 | 5 | 6 |   |   |   |   |   |
|---|---|---|---|---|---|---|---|
| 4 | 4 | 5 |   |   |   |   |   |
| 3 | 3 | 4 | 5 |   | 4 | 5 |   |
| 2 | 2 | 3 | 4 | 3 | 3 | 4 | 5 |
| 1 | 1 | 2 | 3 | 2 | 2 | 3 | 4 |
| 0 | 0 |   |   | 1 | 1 |   |   |
|   |   |   |   | 0 | 0 |   |   |

END POINT (under columns 1-2)
END POINT (under columns 5-6)

FIG. 21B

INITIAL VALUE OF FLOW WITH RESPECT TO END POINT

END POINT
END POINT

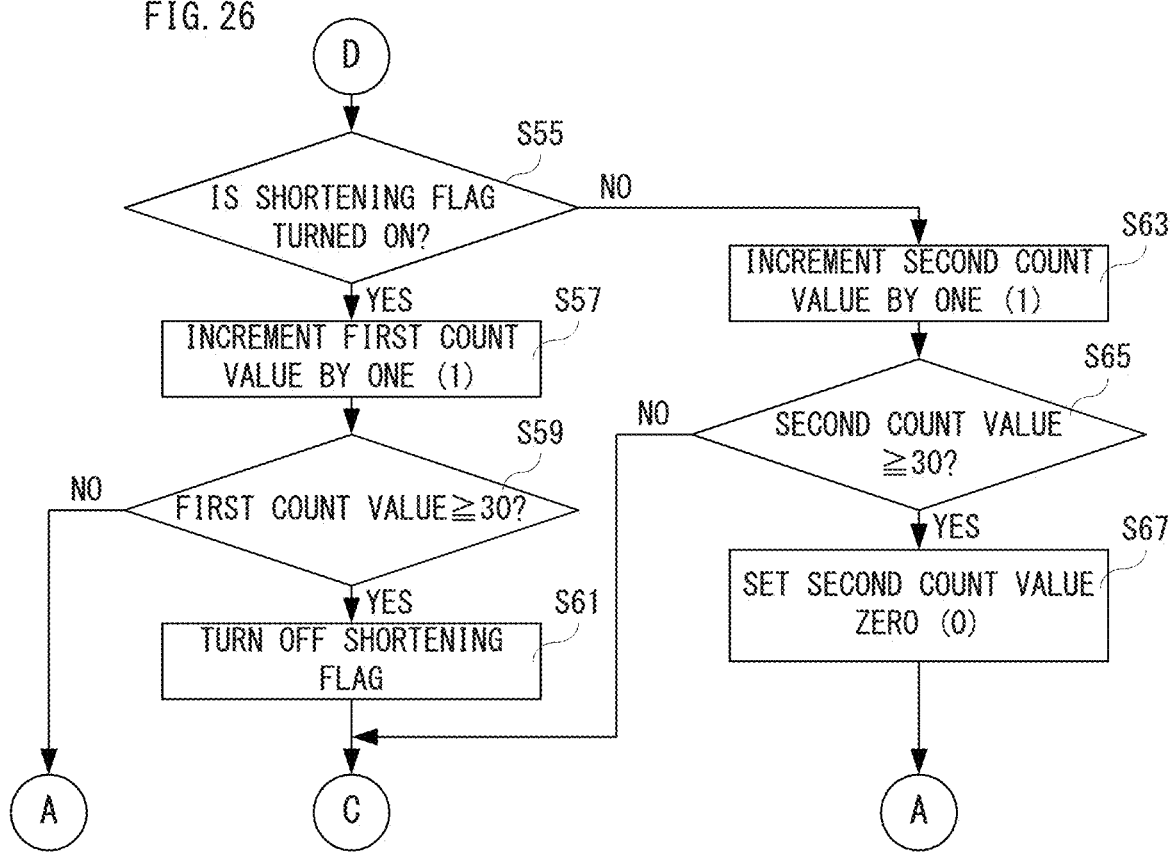

STORAGE MEDIUM, GAME SYSTEM, GAME APPARATUS AND GAME CONTROLLING METHOD

CROSS REFERENCE OF RELATED APPLICATION

The disclosure of Japanese Patent Application No. 2019-100479 filed on May 29, 2019 is incorporated herein by reference.

FIELD

This application describes a storage medium, a game system, a game apparatus and a game controlling method, in which game processing is executed in accordance with presence or absence of a flow of a fluid object.

SUMMARY

It is a primary object of an embodiment(s) to provide a novel storage medium, game system, game apparatus and game controlling method.

Moreover, it is another object of the embodiment(s) to provide a storage medium, game system, game apparatus and game controlling method, capable of deforming a terrain in a virtual space based on an operation input by a player, and generating a flow of a fluid object according to the deformed terrain.

A first embodiment is a non-transitory computer-readable storage medium having stored therein a game program executable by a computer of an information processing apparatus, wherein the game program causes the computer to execute: terrain deformation processing that digs, based on an operation input by a player, a designated section in a virtual space where a terrain object is divided into a plurality of sections; fluid placement processing that places a fluid object in a dug section of the terrain object; shape determination processing that determines whether a shape of an area that dug sections are connected to each other is a long shape; flow control processing that makes the fluid object placed in the area generate a flow when it is determined that the area is a long shape and does not make the fluid object placed in the area generate a flow when it is determined that the area is not a long shape; and game processing that includes at least processing in accordance with presence or absence of a flow of the fluid object in the area.

According to the first embodiment, it is possible to deform the terrain in the virtual space based on an operation input of the player, and to generate a flow of the fluid object in accordance with the deformed terrain.

A second embodiment is the storage medium according to the first embodiment, wherein the shape determination processing determines whether the shape is a long shape by comparing a length parameter indicating a number of shortest sections related to two sections having a greatest number of the shortest sections connecting the two sections among the sections included in the area, with an area parameter indicating a number of the sections included in the area.

According to the second embodiment, it is possible to easily determine whether the shape is a long shape by comparing the length parameter with the area parameter.

A third embodiment is the storage medium according to the second embodiment, wherein the shape determination processing determines that the shape is a long shape when a square of the length parameter is greater than a reference value determined based on the area parameter.

A fourth embodiment is the storage medium according to the second embodiment, wherein the shape determination processing determines that the shape is a long shape when a square of the length parameter is equal to or larger than a value obtained by quadrupling the area parameter.

A fifth embodiment is the storage medium according to the first embodiment, wherein the fluid object is a water object, and the area becomes a river area when there is a flow in the area, and the area becomes a pond area when there is no flow in the area, and the game processing performs different processing for the river area and for the pond area.

According to the fifth embodiment, it is possible to generate a river area or a pond area in the virtual space based on an operation input of the player.

A sixth embodiment is the storage medium according to the fifth embodiment, wherein the game processing includes processing that causes a player character to perform fishing based on an operation input of the player, and executes different processing for fishing in the river area and for fishing in the pond area.

According to the sixth embodiment, different fishing can be enjoyed in the river area or the pond area generated in the virtual space.

A seventh embodiment is the storage medium according to the first embodiment, wherein the flow control processing sets, in the sections in the area, at least a section rendered a start point and a section rendered an end point, and calculates an outflow that is a flow out of the section rendered the start point and an inflow that is a flow into the section rendered the end point, and calculates directions of a flow in each of the sections in the area by combining the outflow and the inflow.

According to the seventh embodiment, it is possible to generate a flow of the fluid object according to a predetermined rule.

An eighth embodiment is the storage medium according to the second embodiment, wherein the flow control processing sets a start point to one section of two sections that the number of shortest sections connecting the two sections becomes the greatest number and an end point to another section of the two sections, and calculates an outflow that is a flow out of the section rendered the start point and an inflow that is a flow into the section rendered the end point, and calculates a direction of a flow in each of the sections in the area by combining the outflow and the inflow.

A ninth embodiment is the storage medium according to the first embodiment, wherein a water source object is placed on the terrain, and the flow control processing generates a flow using the water source object as a water source when the area is connected to the water source object regardless of a result of the shape determination processing.

According to the ninth embodiment, when the area where the drug sections that are connected to each other is connected to the water source object, a flow of the fluid object can be generated according to another predetermined rule.

A tenth embodiment is the storage medium according to the seventh embodiment, wherein a water source object is placed on the terrain, and the flow control processing generates a flow using the water source object as a water source when the area is connected to the water source object regardless of a result of the shape determination processing, the water source being rendered as the start point of the flow.

An eleventh embodiment is a game system comprising a control circuit, wherein the control circuit is configured to execute: terrain deformation processing that digs, based on an operation input by a player, a designated section in a virtual space where a terrain object is divided into a plurality of sections; fluid placement processing that places a fluid object in a dug section of the terrain object; shape determination processing that determines whether a shape of an area that dug sections are connected to each other is a long shape; flow control processing that makes the fluid object placed in the area generate a flow when it is determined that the area is a long shape and does not make the fluid object placed in the area generate a flow when it is determined that the area is not a long shape; and game processing that includes at least processing in accordance with presence or absence of a flow of the fluid object in the area.

A twelfth embodiment is a game apparatus comprising a control circuit, wherein the control circuit is configured to execute: terrain deformation processing that digs, based on an operation input by a player, a designated section in a virtual space where a terrain object is divided into a plurality of sections; fluid placement processing that places a fluid object in a dug section of the terrain object; shape determination processing that determines whether a shape of an area that dug sections are connected to each other is a long shape; flow control processing that makes the fluid object placed in the area generate a flow when it is determined that the area is a long shape and does not make the fluid object placed in the area generate a flow when it is determined that the area is not a long shape; and game processing that includes at least processing in accordance with presence or absence of a flow of the fluid object in the area.

A thirteenth embodiment is a game controlling method, comprising: terrain deformation processing that digs, based on an operation input by a player, a designated section in a virtual space where a terrain object is divided into a plurality of sections; fluid placement processing that places a fluid object in a dug section of the terrain object; shape determination processing that determines whether a shape of an area that dug sections are connected to each other is a long shape; flow control processing that makes the fluid object placed in the area generate a flow when it is determined that the area is a long shape and does not make the fluid object placed in the area generate a flow when it is determined that the area is not a long shape; and game processing that includes at least processing in accordance with presence or absence of a flow of the fluid object in the area.

According to each of the eleventh to thirteenth embodiments, like the first embodiment, it is also possible to deform the terrain in the virtual space based on an operation input of the player, and to generate a flow of the fluid object in accordance with the deformed terrain.

The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 20A is an illustration view showing a non-limiting example distance map with respect to a start point, and FIG. 20B is an illustration view showing non-limiting example initial values of flows of water with respect to the start point in case of FIG. 20A.

FIG. 21A is an illustration view showing a non-limiting example distance map with respect to an end point, and FIG. 21B is an illustration view showing non-limiting example initial values of flows of water with respect to the end point in case of FIG. 21A.

FIG. 26 is a flow chart showing a further part of the non-limiting example game image generation processing of the processor of the main body apparatus shown in FIG. 6, following FIG. 25.

DETAILED DESCRIPTION OF NON-LIMITING EXAMPLE EMBODIMENTS

A non-limiting example game system according to an exemplary embodiment will be described in the following. The non-limiting example game system 1 according to this embodiment comprises a main body apparatus (an information processing apparatus that functions as a game apparatus main body in this embodiment) 2, a left controller 3 and a right controller 4. The left controller 3 and the right controller 4 are attachable to or detachable from the main body apparatus 2, respectively. That is, the game system 1 can be used as a unified apparatus formed by attaching each of the left controller 3 and the right controller 4 to the main body apparatus 2. Moreover, in the game system 1, the main body apparatus 2, the left controller 3 and the right controller 4 can also be used as separate bodies (see FIG. 2). In the following, the hardware structure of the game system 1 according to this embodiment will be described, and then, the control of the game system 1 of this embodiment will be described.

Figure 1:
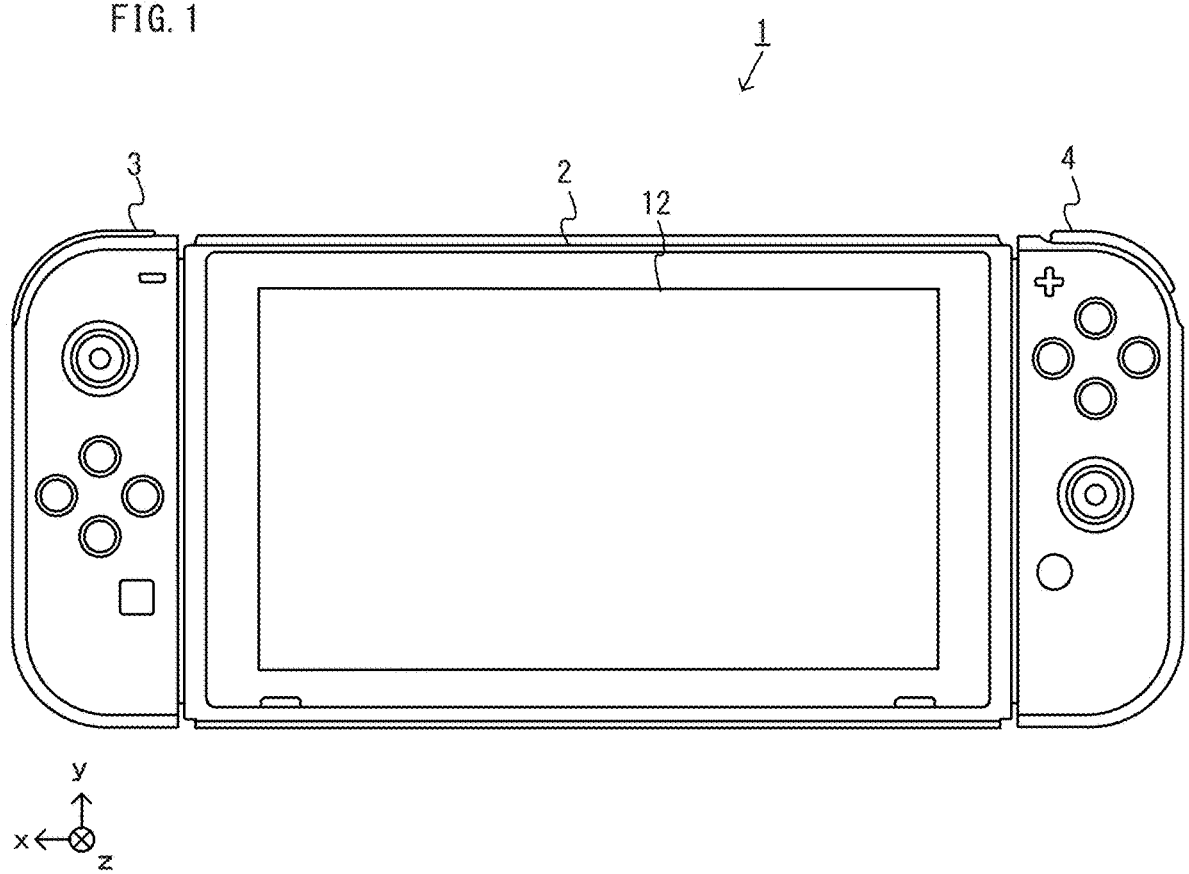
FIG. 1 is an illustration view showing a non-limiting example state wherein a left controller and a right controller are attached to a main body apparatus of this embodiment.

FIG. 1 is an illustration view showing an example of a state where the left controller 3 and the right controller 4 are attached to the main body apparatus 2. As shown in FIG. 1, the left controller 3 and the right controller 4 is respectively attached to the main body apparatus 2, thereby to be unified it. The main body apparatus 2 is an apparatus for performing various processing (game processing, for example) in the game system 1. The main body apparatus 2 comprises a display 12. Each of the left controller 3 and the right controller 4 is a device comprising an operation section with which a user provides inputs.

Figure 2:
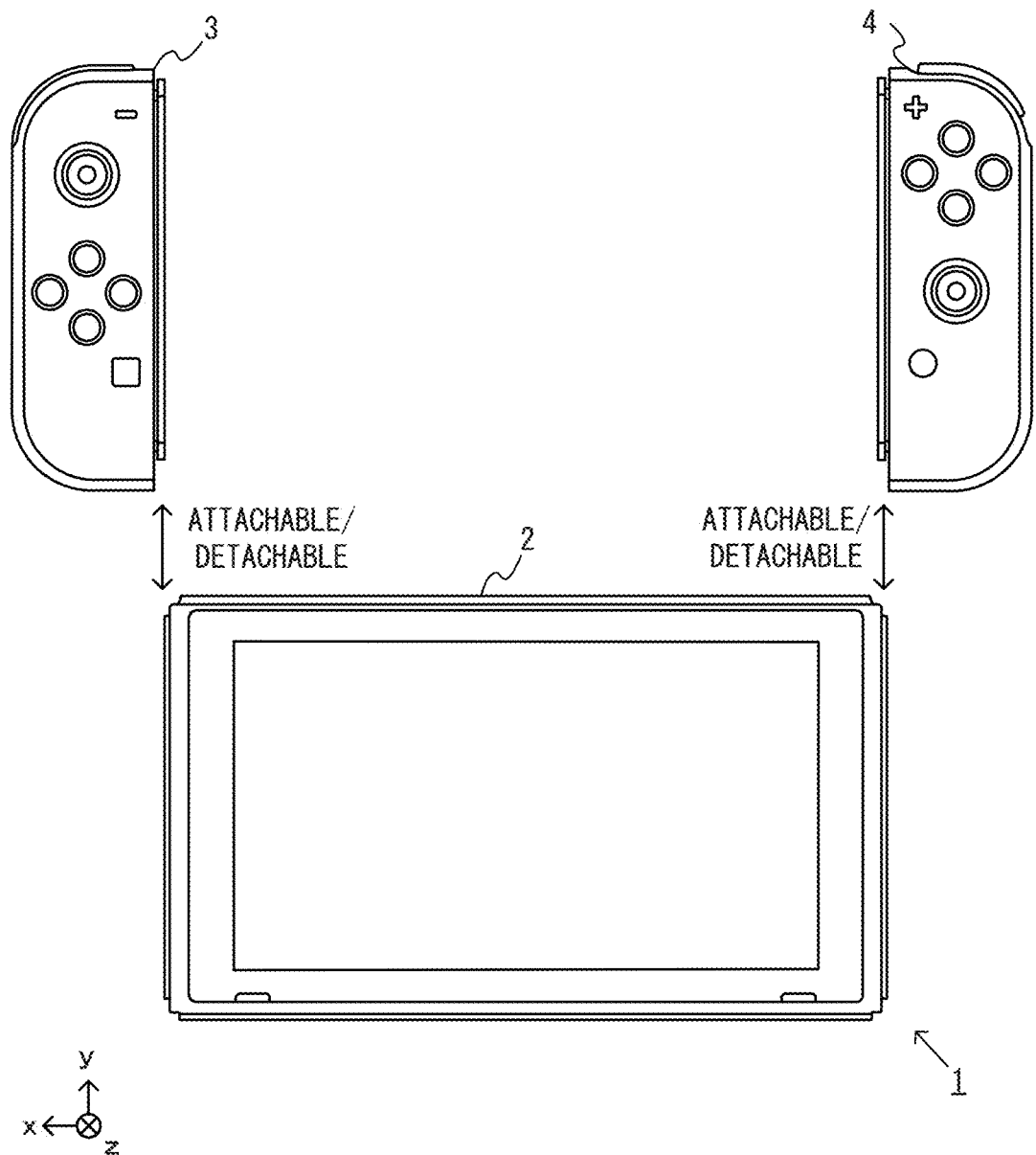
FIG. 2 is an illustration view showing a non-limiting example state where the left controller and the right controller are detached from the main body apparatus, respectively.

FIG. 2 is an illustration view showing an example of a state where the left controller 3 and the right controller 4 are detached from the main body apparatus 2, respectively. As shown in FIG. 1 and FIG. 2, each of the left controller 3 and the right controller 4 is attachable to and detachable from the main body apparatus 2. In addition, it should be noted that the left controller 3 and the right controller 4 may be referred to collectively as a "controller" in the following.

Figure 3:
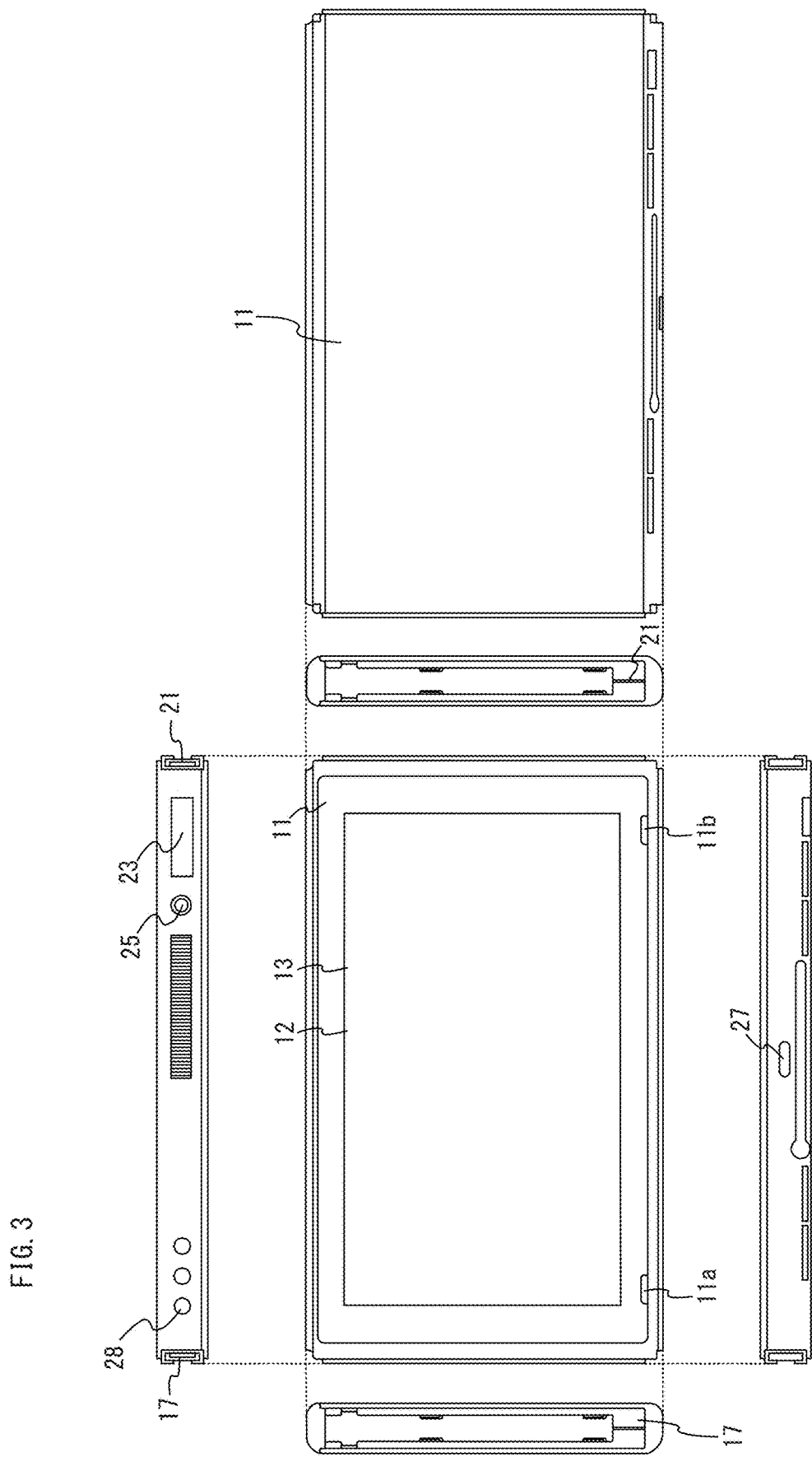
FIG. 3 is six orthogonal views showing a non-limiting example main body apparatus shown in FIG. 1 and FIG. 2.

FIG. 3 is six orthogonal views showing an example of the main body apparatus 2. As shown in FIG. 3, the main body apparatus 2 comprises a housing 11 having an approximately plate-shape. In this embodiment, a main surface (in other words, a surface on a front side, that is, a surface on which the display 12 is provided) of the housing 11 has a generally rectangular shape.

In addition, a shape and a size of the housing 11 are optional. As an example, the housing 11 may be of a portable size. Moreover, the main body apparatus 2 alone or the unified apparatus obtained by attaching the left controller 3 and the right controller 4 to the main body apparatus 2 may be a mobile apparatus. The main body apparatus 2 or the unified apparatus may be a handheld apparatus. The main body apparatus 2 or the unified apparatus may be a handheld apparatus or a portable apparatus.

As shown in FIG. 3, the main body apparatus 2 comprises the display 12 that is provided on the main surface of the housing 11. The display 12 displays an image generated by the main body apparatus 2. In this embodiment, the display 12 is a liquid crystal display device (LCD). However, the display 12 may be an arbitrary type display. Moreover, the main body apparatus 2 comprises a touch panel 13 on a screen of the display 12. In this embodiment, the touch panel 13 is of a type that allows a multi-touch input (e.g., a capacitive type). However, the touch panel 13 may be of any type, and for example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are emitted through the speaker holes 11a and 11b.

Moreover, the main body apparatus 2 comprises a left terminal 17 that is a terminal for the main body apparatus 2 to perform wired communication with the left controller 3, and a right terminal 21 that is a terminal for the main body apparatus 2 performs wired communication with the right controller 4.

As shown in FIG. 3, the main body apparatus 2 comprises a slot 23. The slot 23 is provided on an upper side surface of the housing 11. The slot 23 has a shape to which a predetermined type of storage medium can be attached. The predetermined type of storage medium is, for example, a dedicated storage medium (e.g., a dedicated memory card) for the game system 1 or an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Moreover, the main body apparatus 2 comprises a power button 28.

The main body apparatus 2 comprises a lower terminal 27. The lower terminal 27 is a terminal through which the main body apparatus 2 performs communication with a cradle. In this embodiment, the lower terminal 27 is a USB connector (more specifically, a female connector). When the unified apparatus or the main body apparatus 2 alone is put on the cradle, the game system 1 can display on a stationary monitor an image generated by and output from the main body apparatus 2. Moreover, in this embodiment, the cradle has the function of charging the unified apparatus or the main body apparatus 2 alone that is put on the cradle. Moreover, the cradle has a function of a hub device (specifically, a USB hub).

Figure 4:
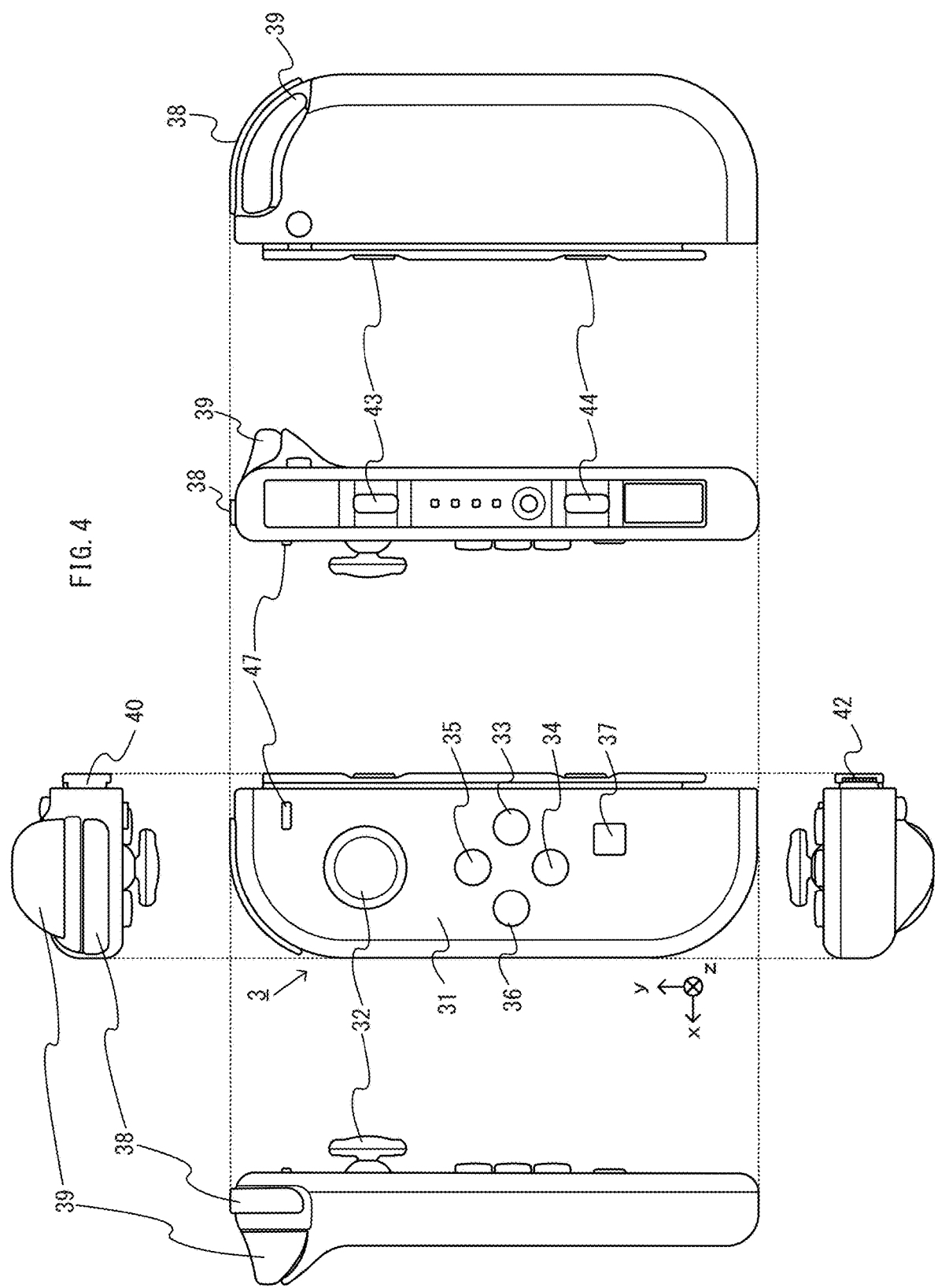
FIG. 4 is sixth orthogonal views showing a non-limiting example left controller shown in FIG. 1 and FIG. 2.

FIG. 4 is six orthogonal views showing an example of the left controller 3. As shown in FIG. 4, the left controller 3 comprises a housing 31. In this embodiment, the housing 31 has a vertically long shape, that is, is shaped to be long in an up-down direction (i.e., a y-axis direction shown in FIG. 1 and FIG. 4). In a state where the left controller 3 is detached from the main body apparatus 2, the left controller 3 can also be held in a direction that the left controller 3 is vertically long. The housing 31 has a shape and a size that when held in a direction that the housing 31 is vertically long, the housing 31 can be held with one hand, especially the left hand. Moreover, the left controller 3 can also be held in a direction that the left controller 3 is horizontally long. When held in the direction that the left controller 3 is horizontally long, the left controller 3 may be held with both hands.

The left controller 3 comprises an analog stick 32. As shown in FIG. 4, the analog stick 32 is provided on a main surface of the housing 31. The analog stick 32 can be used as a direction input section capable of inputting a direction. The user tilts the analog stick 32 and thereby can input a direction corresponding to a tilted direction (and input a magnitude corresponding to a tilted angle). In addition, the left controller 3 may comprise a cross key or a slide stick capable of performing a slide input, or the like as the direction input section, instead of the analog stick. Moreover, in this embodiment, it is possible to provide an input by pressing the analog stick 32.

The left controller 3 comprises various operation buttons. The left controller 3 comprises four (4) operation buttons 33-36 (specifically, a right direction button 33, a down direction button 34, an up direction button 35 and a left direction button 36) on the main surface of the housing 31. Furthermore, the left controller 3 comprises a record button 37 and a "−" (minus) button 47. The left controller 3 comprises an L-button 38 and a ZL-button 39 in an upper left portion of a side surface of the housing 31. Moreover, the left controller 3 comprises an SL-button 43 and an SR-button 44 on a surface at a side to be attached to the main body apparatus 2 out of side surfaces of the housing 31. These operation buttons are used to input instructions according to various programs (e.g., an OS program and an application program) executed by the main body apparatus 2.

Moreover, the left controller 3 comprises a terminal 42 for the left controller 3 to perform wired communication with the main body apparatus 2.

Figure 5:
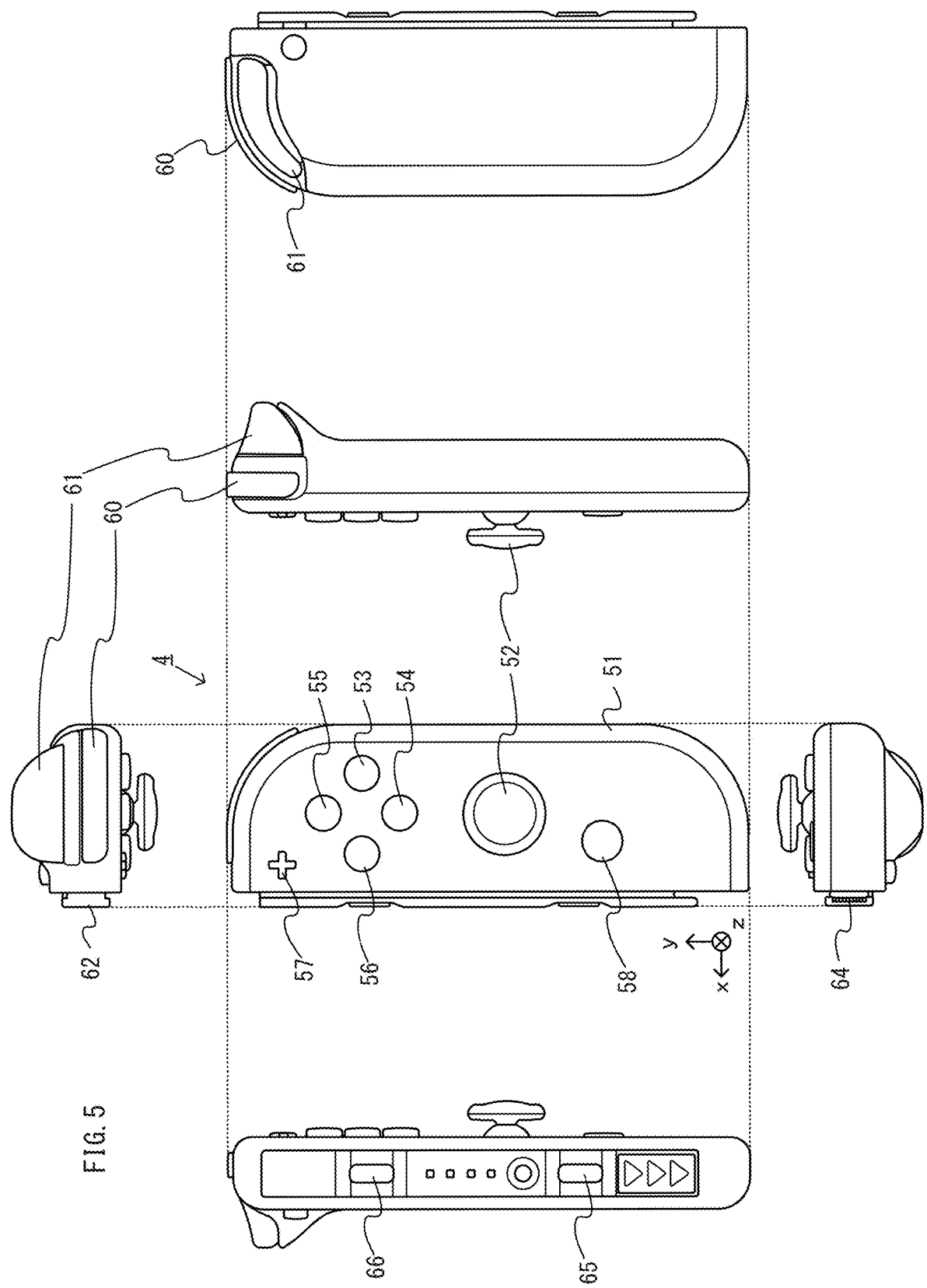
FIG. 5 is sixth orthogonal views showing a non-limiting example right controller shown in FIG. 1 and FIG. 2.

FIG. 5 is six orthogonal views showing an example of the right controller 4. As shown in FIG. 5, the right controller 4 comprises a housing 51. In this embodiment, the housing 51 has a vertically long shape, that is, a shape long in the up-down direction. In a state where the right controller 4 is detached from the main body apparatus 2, the right controller 4 can also be held in a direction that the right controller 4 is vertically long. The housing 51 has a shape and a size that when held in a direction that the housing 51 is vertically long, the housing 51 can be held with one hand, especially the right hand. Moreover, the right controller 4 can also be held in a direction that the right controller 4 is horizontally long. When held in the direction that the right controller 4 is horizontally long, the right controller 4 may be held with both hands.

Similar to the left controller 3, the right controller 4 comprises an analog stick 52 as a direction input section. In this embodiment, the analog stick 52 has the same configuration as that of the analog stick 32 of the left controller 3. Moreover, the right controller 4 may comprise a cross key or a slide stick capable of performing a slide input, or the like as the direction input section, instead of the analog stick. Moreover, similar to the left controller 3, the right controller 4 comprises four (4) operation buttons 53-56 (specifically, an A-button 53, a B-button 54, an X-button 55 and a Y-button 56) on the main surface of the housing 51. Furthermore, the right controller 4 comprises a "+" (plus) button 57 and a home button 58. Moreover, the right controller 4 comprises an R-button 60 and a ZR-button 61 in an upper right portion of a side surface of the housing 51. Moreover, similar to the left controller 3, the right controller 4 comprises an SL-button 65 and an SR-button 66.

Moreover, the right controller 4 comprises a terminal 64 for the right controller 4 to perform wired communication with the main body apparatus 2.

Figure 6:
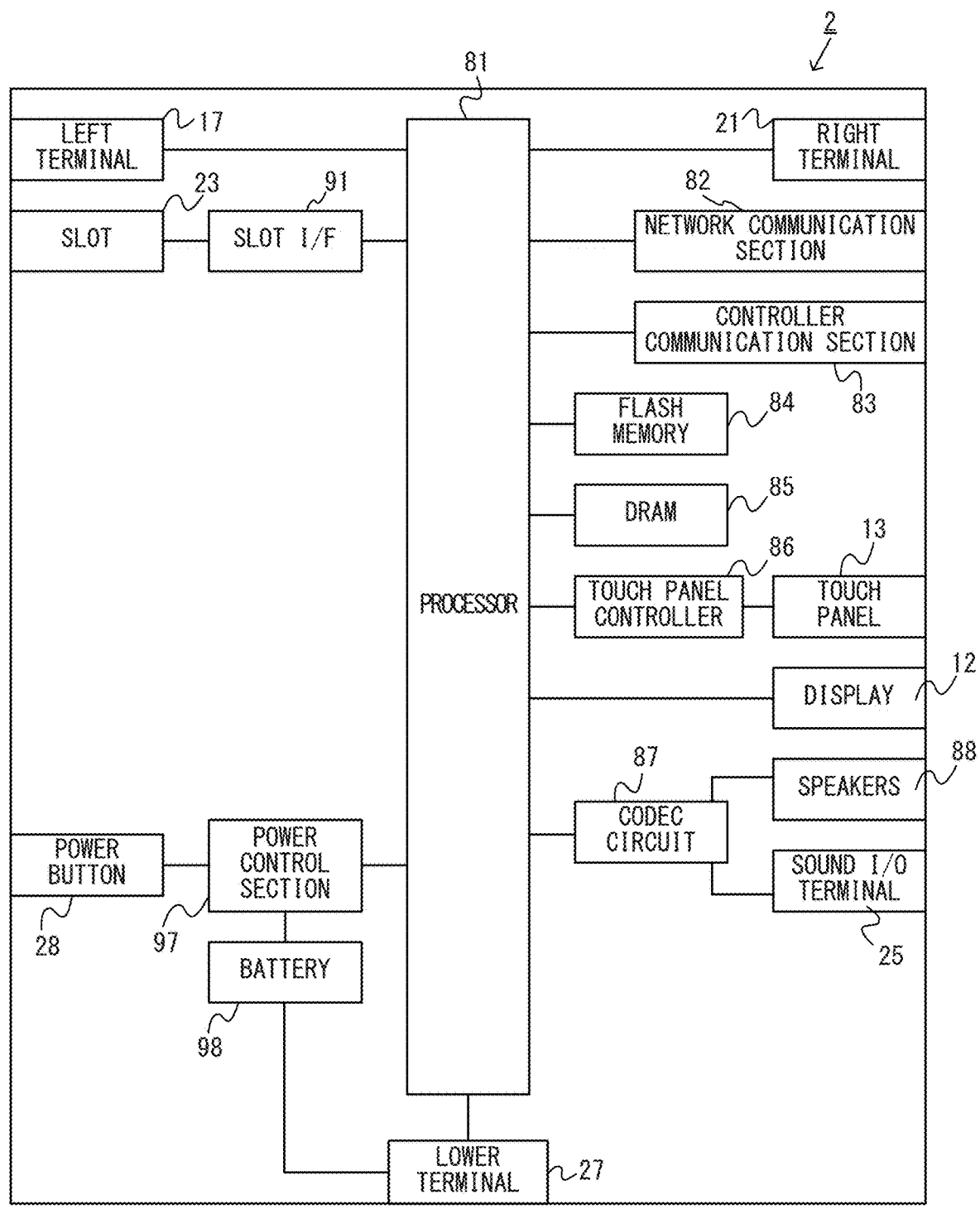
FIG. 6 is a block diagram showing a non-limiting example internal configuration of the main body apparatus shown in FIG. 1 and FIG. 2.

FIG. 6 is a block diagram showing an example of an internal configuration of the main body apparatus 2. The main body apparatus 2 comprises components 81-91, 97 and 98 shown in FIG. 6 in addition to components shown in FIG. 3. Some of the components 81-91, 97 and 98 may be mounted as electronic components on an electronic circuit board to be accommodated in the housing 11.

The main body apparatus 2 comprises a processor 81. The processor 81 is an information processing section that performs various types of information processing to be performed by the main body apparatus 2, and may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 comprises a flash memory 84 and a DRAM (Dynamic Random Access Memory) 85 as examples of internal storage media incorporated in the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 comprises a slot interface (hereinafter, abbreviated as "I/F") 91. The slot I/F 91 is connected to the processor 81. The slot I/F 91 is connected to the slot 23, and reads and writes, in accordance with instructions from the processor 81, data from and to the predetermined type of storage medium (e.g., a dedicated memory card) attached to the slot 23.

The processor 81 appropriately reads and writes data from and to the flash memory 84, the DRAM 85 and each of the above storage media, thereby performing the above-described information processing.

The main body apparatus 2 comprises a network communication section 82. The network communication section 82 is connected to the processor 81. The network communication section 82 performs communication (specifically, wireless communication) with external apparatus via a network. In this embodiment, as a first communication manner, the network communication section 82 is connected to a wireless LAN to perform communication with external apparatus by a system in conformity with the Wi-Fi standard. Moreover, as a second communication manner, the network communication section 82 performs wireless communication with a further main body apparatus 2 of the same type by a predetermined communication system (e.g., communication based on a unique protocol or infrared light communication). In addition, the wireless communication in the above-described second communication manner achieves a function of enabling so-called "local communication", in which the main body apparatus 2 can perform wireless communication with further main body apparatus 2 placed in a closed local network area, and a plurality of main body apparatus 2 perform communication directly with each other to transmit and receive data. The main body apparatus 2 comprises a controller communication section 83. The controller communication section 83 is connected to the processor 81. The controller communication section 83 performs wireless communication with the left controller 3 and/or the right controller 4. Although communication system between the main body apparatus 2 and the left controller 3 and the right controller 4 is optional, in this embodiment, the controller communication section 83 performs communication with the left controller 3 and with the right controller 4 in conformity with Bluetooth (registered trademark) standard.

The processor 81 is connected to the left terminal 17, the right terminal 21 and the lower terminal 27. When performing wired communication with the left controller 3, the processor 81 transmits data to the left controller 3 via the left terminal 17 and receives (or acquires) operation data from the left controller 3 via the left terminal 17. Moreover, when performing wired communication with the right controller 4, the processor 81 transmits data to the right controller 4 via the right terminal 21 and receives (or acquires) operation data from the right controller 4 via the right terminal 21. Moreover, when performing communication with the cradle, the processor 81 transmits data to the cradle via the lower terminal 27. Thus, in this embodiment, the main body apparatus 2 can perform both wired communication and wireless communication with each of the left controller 3 and the right controller 4. Moreover, when the unified apparatus formed by attaching the left controller 3 and the right controller 4 to the main body apparatus 2 or the main body apparatus 2 alone is attached to the cradle, the main body apparatus 2 can output data (e.g., display image data and sound data) to the stationary monitor or the like via the cradle.

Here, the main body apparatus 2 can perform communication with a plurality of left controllers 3 simultaneously (in other words, in parallel). Moreover, the main body apparatus 2 can perform communication with a plurality of right controllers 4 simultaneously (in other words, in parallel). Therefore, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 comprises a touch panel controller 86 that is a circuit for controlling the touch panel 13. The touch panel controller 86 is connected between the touch panel 13 and the processor 81. Based on a signal from the touch panel 13, the touch panel controller 86 generates, for example, data indicating a position where a touch input is performed, and outputs the data to the processor 81.

Moreover, the display 12 is connected to the processor 81. The processor 81 displays a generated image (e.g., an image generated by performing the above information processing) and/or an externally acquired image on the display 12.

The main body apparatus 2 comprises a codec circuit 87 and speakers (specifically, a left speaker and a right speaker) 88. The codec circuit 87 is connected to the speakers 88 and a sound input/output (I/O) terminal 25 and also connected to the processor 81. The codec circuit 87 is a circuit for controlling an input/output of sound data to and from the speakers 88 and the sound input/output terminal 25.

The main body apparatus 2 comprises a power control section 97 and a battery 98. The power control section 97 is connected to the battery 98 and the processor 81. Moreover, although not shown in FIG. 6, the power control section 97 is connected to respective components of the main body apparatus 2 (specifically, components that receive power supplied from the battery 98, the left terminal 17 and the right terminal 21). Based on a command from the processor 81, the power control section 97 controls power supply from the battery 98 to the above-described components.

Moreover, the battery 98 is connected to the lower terminal 27. When an external charging device (e.g., a cradle) is connected to the lower terminal 27, and power is supplied to the main body apparatus 2 via the lower terminal 27, the battery 98 is charged with the supplied power.

Figure 7:
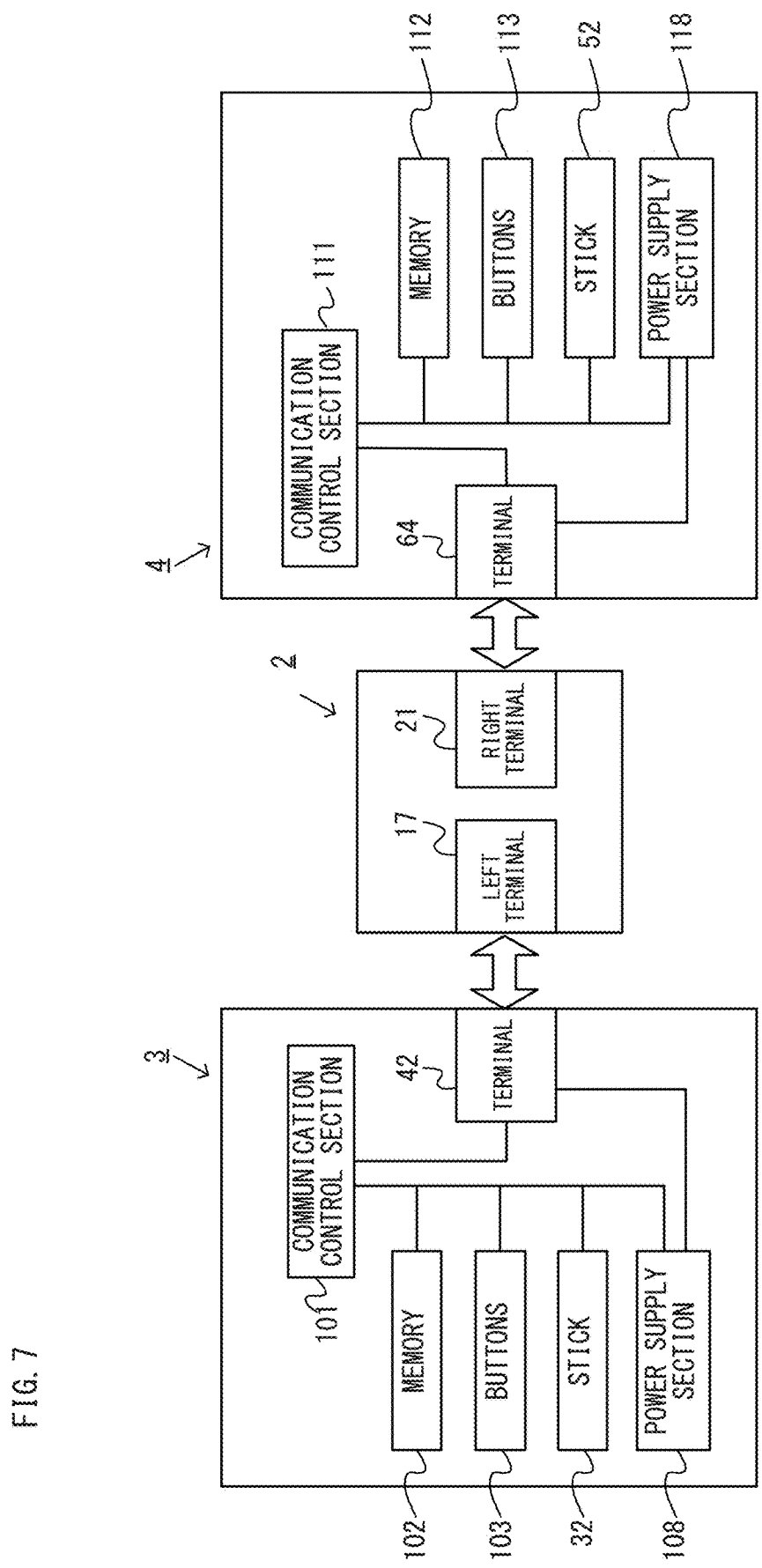
FIG. 7 is a block diagram showing non-limiting example internal configurations of the main body apparatus, the left controller and the right controller shown in FIG. 1 and FIG. 2.

FIG. 7 is a block diagram showing examples of internal configurations of the main body apparatus 2, the left controller 3 and the right controller 4. In addition, details of the internal configuration of the main body apparatus 2 are shown in FIG. 6 and thus are omitted in FIG. 7.

The left controller 3 comprises a communication control section 101 that performs communication with the main body apparatus 2. As shown in FIG. 7, the communication control section 101 is connected to components including the terminal 42. In this embodiment, the communication control section 101 can perform communication with the main body apparatus 2 through both wired communication via the terminal 42 and wireless communication not via the terminal 42. The communication control section 101 controls a method of performing communication by the left controller 3 with the main body apparatus 2. That is, when the left controller 3 is attached to the main body apparatus 2, the communication control section 101 performs communication with the main body apparatus 2 via the terminal 42. Moreover, when the left controller 3 is detached from the main body apparatus 2, the communication control section 101 performs wireless communication with the main body apparatus 2 (specifically, the controller communication section 83). The wireless communication between the communication control section 101 and the controller communication section 83 is performed in accordance with Bluetooth (registered trademark) standard, for example. Moreover, the left controller 3 comprises a memory 102 such as a flash memory. The communication control section 101 is constituted by a microcomputer (also referred to as a microprocessor), for example, and executes firmware stored in the memory 102, thereby performing various processing.

The left controller 3 comprises buttons 103 (specifically, the buttons 33-39, 43, 44 and 47). Further, the left controller 3 comprises the analog stick (in FIG. 7, indicated as "stick") 32. The respective buttons 103 and the analog stick 32 outputs information regarding an operation performed to itself to the communication control section 101 repeatedly at appropriate timings.

The communication control section 101 acquires information regarding an input(s) (specifically, information regarding an operation or the detection results of the sensors) from respective input sections (specifically, the buttons 103, the analog stick 32 and the sensors 104 and 105). The communication control section 101 transmits operation data including the acquired information (or information obtained by performing predetermined processing on the acquired information) to the main body apparatus 2. In addition, the operation data is transmitted repeatedly, once every predetermined time period. In addition, the interval that the information regarding an input(s) is transmitted from each of the input sections to the main body apparatus 2 may or may not be the same.

The above-described operation data is transmitted to the main body apparatus 2, whereby the main body apparatus 2 can obtain an input(s) provided to the left controller 3. That is, the main body apparatus 2 can determine operations on the buttons 103 and the analog stick 32 based on the operation data.

The left controller 3 comprises a power supply section 108. In this embodiment, the power supply section 108 has a battery and a power control circuit. Although not shown, the power control circuit is connected to the battery and also connected to components of the left controller 3 (specifically, components that receive power supplied from the battery).

As shown in FIG. 7, the right controller 4 comprises a communication control section 111 that performs communication with the main body apparatus 2. Moreover, the right controller 4 comprises a memory 112 connected to the communication control section 111. The communication control section 111 is connected to components including the terminal 64. The communication control section 111 and the memory 112 have functions similar to those of the communication control section 101 and the memory 102, respectively, of the left controller 3. Therefore, the communication control section 111 can perform communication with the main body apparatus 2 through both wired communication via the terminal 64 and wireless communication not via the terminal 64 (specifically, communication in conformity with the Bluetooth (registered trademark) standard), and a method of communication to be performed with the main body apparatus 2 is controlled by the right controller 4.

The right controller 4 comprises input sections similar to the input sections of the left controller 3. Specifically, the right controller 4 comprises buttons 113 and the analog stick 52. These input sections have functions similar to those of the input sections of the left controller 3 and operate similarly to the input sections of the left controller 3.

The right controller 4 comprises a power supply section 118. The power supply section 118 has a function similar to the power supply section 108 of the left controller 3, and operates similarly to the power supply section 108.

Next, with reference to FIG. 8-FIG. 21, an outline of game processing of a virtual game executed in the game system 1 of this embodiment will be described.

Figure 8:
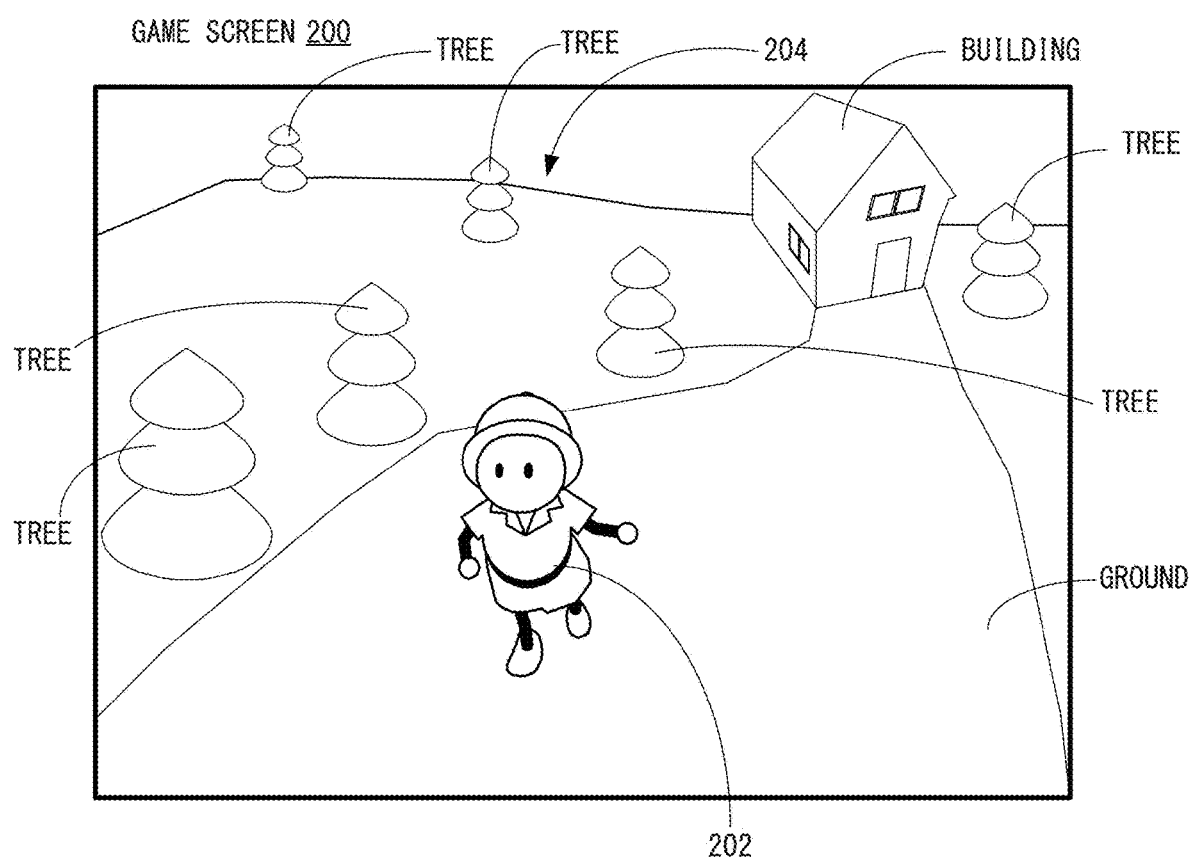
FIG. 8 is an illustration view showing a non-limiting first example game image.

FIG. 8 is an illustration view showing a non-limiting first example game image displayed on a display (for example, the display 12) when a virtual game application according to this embodiment is executed.

The main body apparatus 2 also functions as an image processing apparatus, and generates and outputs (displays) display image data corresponding to various kinds of screens of a game image, etc. The processor 81 arranges various kinds of objects and characters in a three-dimensional virtual space so as to generate a certain sight or scene. An image that this scene is imaged by a virtual camera (viewed from a viewpoint) is displayed on the display 12 as a game image.

A game image shown in FIG. 8 is a non-limiting example of a game screen 200, and includes a player character 202 and a plurality of background objects 204. Moreover, a non-player character (fish object 206 described later) may be displayed.

The player character 202 is an object or character whose action or motion is controlled by a player. In this embodiment, the player character 202 is a character imitating a human being. The action or motion of the player character 202 corresponds to moving, deforming a terrain, acquiring an item, delivering an item to a non-player character, acquiring an item from a non-player character, talking with a non-player character, acquiring a non-player character, catching a non-player character, etc. in a virtual certain place, i.e., in a virtual space. Moreover, in this embodiment, the item means not only tools used by the player character 202 or the non-player character (shovel or scoop and fishing rod, in this embodiment) but also various kinds of objects used or possessed by the player character 202 or the non-player character, such as vegetables, flowers, tree nuts (or fruits), flower or vegetable seeds, insects, fishes, shells, treasure, money, etc.

Moreover, the non-player character is an object or character whose action or motion is controlled by a computer (processor 81 of FIG. 6) rather than the player. As an example, the non-player character is a character imitating human beings other than the player character 202 or animals, and an object imitating fishes, birds and insects. The action or motion of the non-player character corresponds to moving, acquiring an item from the player character 202, delivering an item to the player character 202, being delivered with an item from the player character 202, being caught by the player character 202.

However, there may be a case where the non-player character that is an object imitating fishes, birds or insects is used or possessed as an item by the player character 202 or the non-player character imitating human beings other than player character 202 or animals.

The background object 204 is an object of the terrain arranged in the virtual space. The terrain means, in general, the ground (including roads, land, flower gardens, farmland, etc.), slopes, floors, trees, grass, flowers, buildings, stairs, rivers, ponds, holes, caves, cliffs, walls, fences, etc.

In an example shown in FIG. 8, a ground object, a plurality of tree objects and a building object are provided as the background object 204. Hereinafter, in this specification, in describing the background object 204, i.e., the terrain objects, only a name of the terrain will be indicated to omit a word "object". Similarly, in this specification, in describing the item, only a name of the item will be indicated and a word "object" will be omitted.

In the virtual game of this embodiment, if the player character 202 equips a shovel or scoop 210 as an item, the player character 202 can dig the ground using this shovel 210. Moreover, the player character 202 can fill a part or whole of a hole formed on the ground using the shovel 210, or can fill a part or whole of the river or pond formed in the game field in the virtual space.

Figure 9:
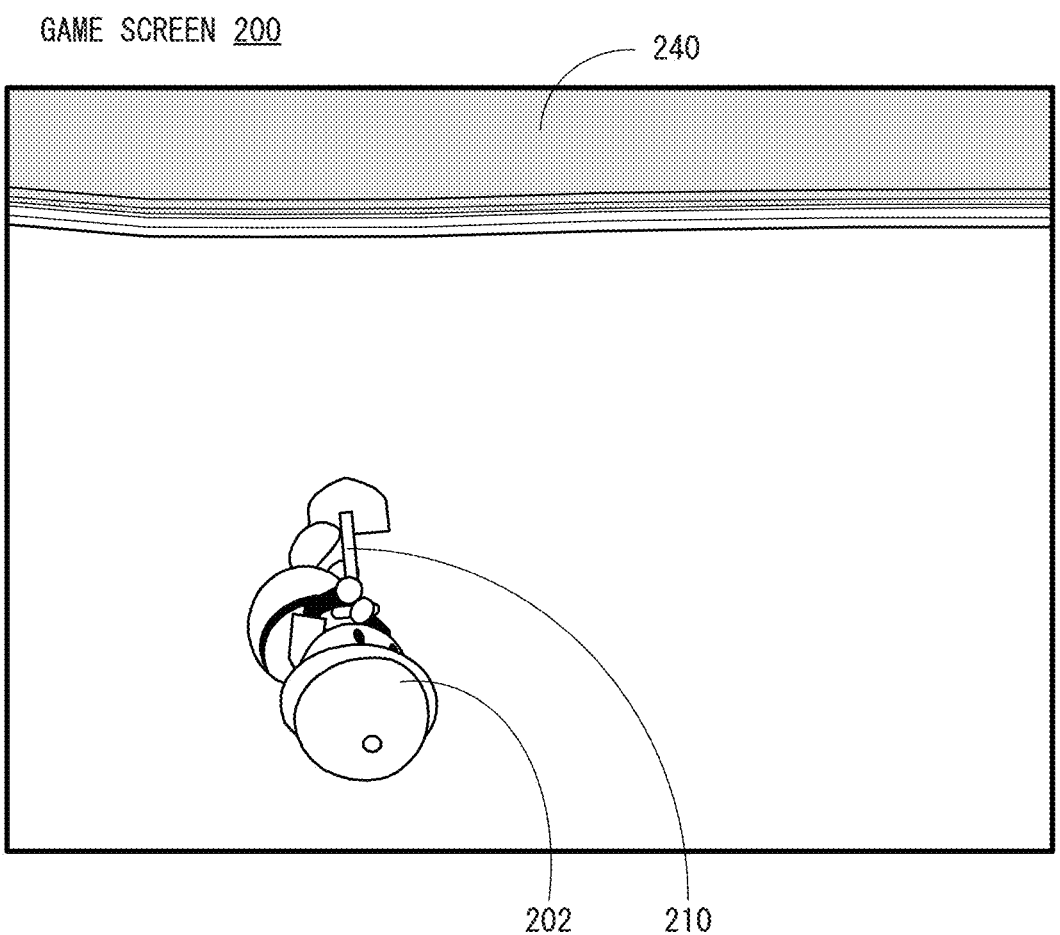
FIG. 9 is an illustration view showing a non-limiting second example game image.
Figure 10:
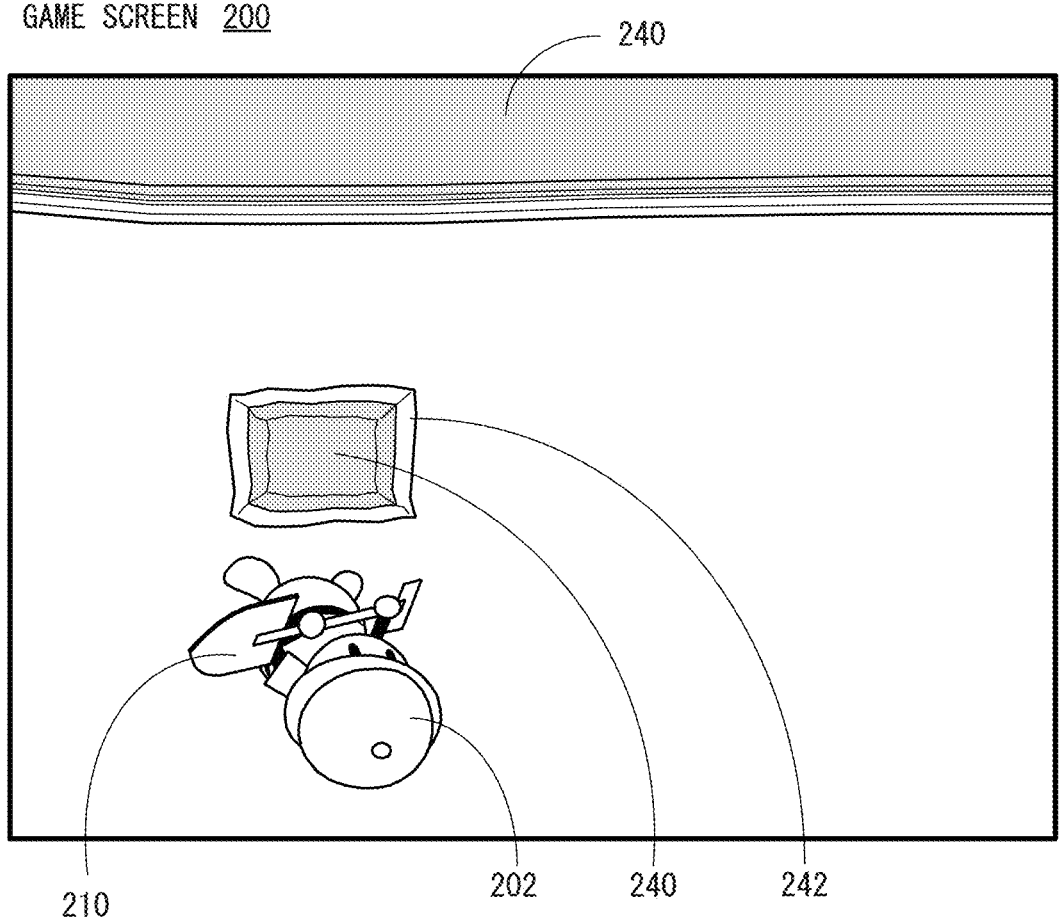
FIG. 10 is an illustration view showing a non-limiting third example game image.

FIG. 9 is an illustration view showing a non-limiting example game screen 200 before digging the ground, and FIG. 10 is an illustration view showing a non-limiting example game screen 200 after forming a hole by digging the ground. FIG. 9 and FIG. 10 are illustration views that a part of a game field is viewed in bird's-eye from the above the virtual space.

In FIG. 9 and FIG. 10, the river flows sideways in an upper part of the game screen 200 and the ground spreads below the river. When the game screen 200 shown in FIG. 9 is displayed on the display 12, if the A-button 53 is depressed (or operated) in a state where the player character 202 is made to hold the shovel 210, a part of the ground in a direction that the player character 202 faces is dug and a hole is formed as shown in FIG. 10. Moreover, as shown in FIG. 10, water is placed in the formed hole. Hereinafter, in this specification, an area where water is placed will be called a "water place".

Moreover, in the game screen 200 shown in FIG. 10, when the player character 202 faces a direction that the hole is formed, if the A-button 53 is depressed, the hole is filled, and as shown in FIG. 9, the hole is changed (or is returned) to the ground.

That is, the player can change or deform the terrain in the virtual space by causing the player character 202 to perform an action. In this embodiment, the player causes, in the virtual space, the player character 202 to act so as to dig a hole in the ground and to expand the hole, thereby creating an area with no flow of water or an area with a flow of water. In this embodiment, the area with no flow of water is a pond area (or a pond), and the area with a flow of water is a river area (or a river).

Figure 11:
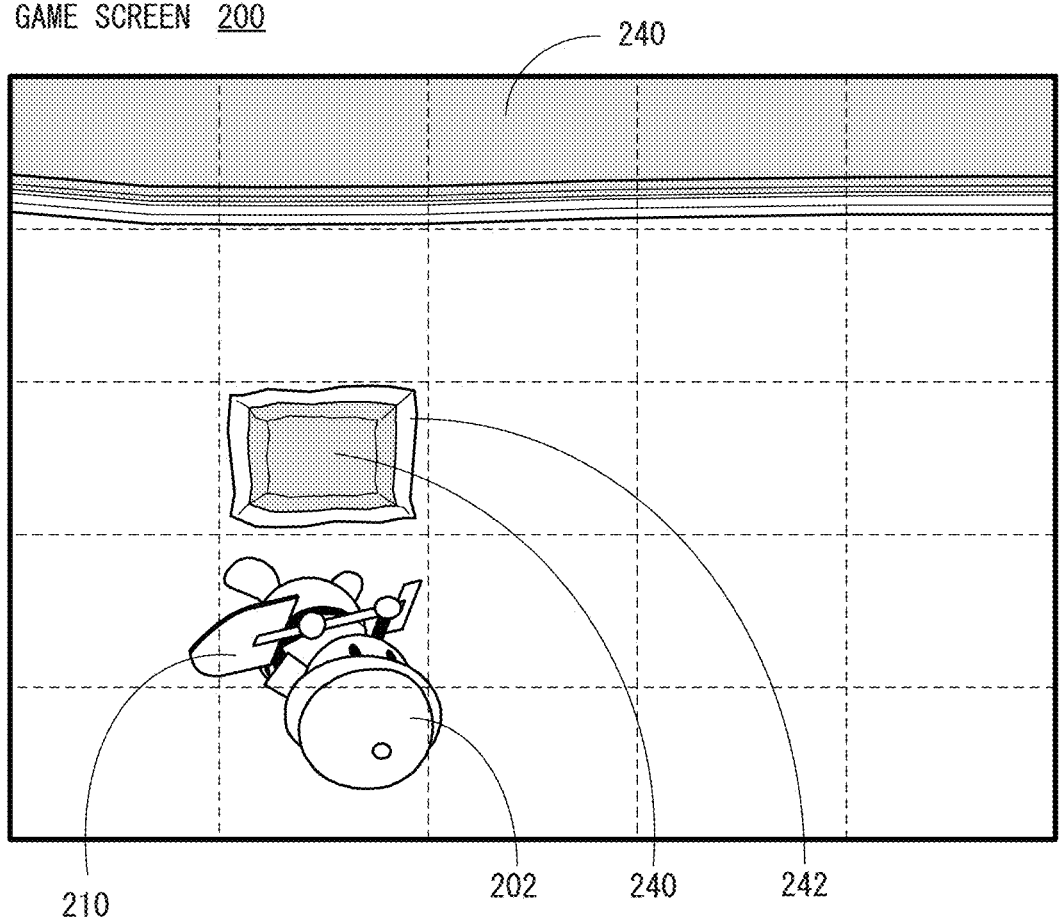
FIG. 11 is an illustration view showing a non-limiting fourth example game image.
Figure 12:
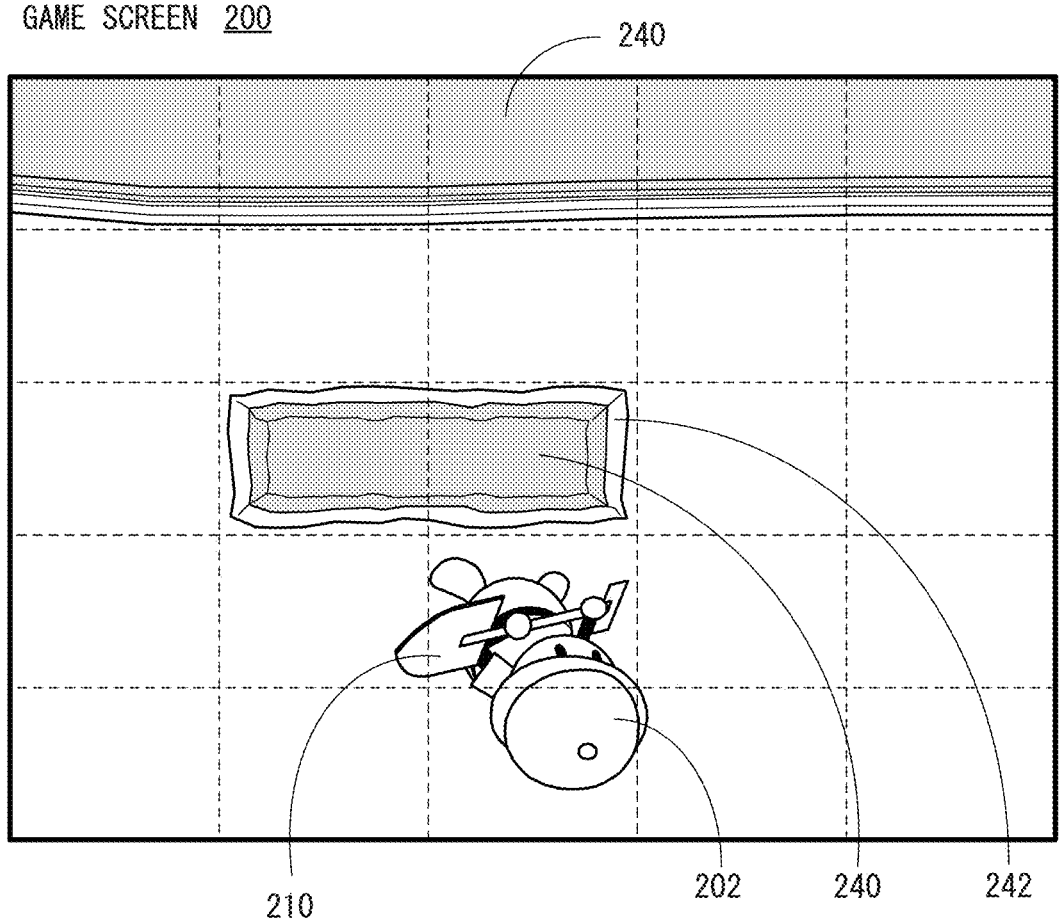
FIG. 12 is an illustration view showing a non-limiting fifth example game image.

As shown in FIG. 11 and FIG. 12, in this embodiment, the game field in the virtual space is divided with a grid pattern, and the terrain can be made to be deformed per a grid unit of the grid pattern or division unit (hereinafter, referred to as "unit"). That is, in this embodiment, one (1) unit is corresponding to one (1) pixel. FIG. 11 is an illustration view that dotted lines for indicating that the game field is divided with a grid pattern are added to the game screen 200 shown in FIG. 10. As shown in FIG. 11, the ground is dug and a hole is formed, for each unit. Moreover, as shown in FIG. 12, if a hole is formed in a unit adjacent in the right to the unit that the hole has been formed in FIG. 11, units are connected to each other, and thus, two holes are connected (or joined) to each other, whereby a water place of two units can be formed. Dotted lines for indicating a state divided with a grid pattern are added in FIG. 12 similar to FIG. 11.

Thus, by forming holes in a plurality of adjacent units, the holes formed in respective units are connected to each other, and if water is placed in the connected holes, a water place can be formed. That is, a pond or a river is formed. In this embodiment, when a shape of the water place formed by forming holes in a plurality of adjacent units is a long shape, it is determined that the water place is a river. Moreover, when a shape of the water place formed by forming holes in a plurality of adjacent units is not a long shape, it is determined that the water place is a pond. However, since the water place is formed by forming holes in a plurality of adjacent units, it can be said that whether the water place is a river or a pond is determined by determining whether a shape of the hole formed by the plurality of holes connected to each other or a shape of a plurality of units connected to each other is a long shape.

Figure 13:
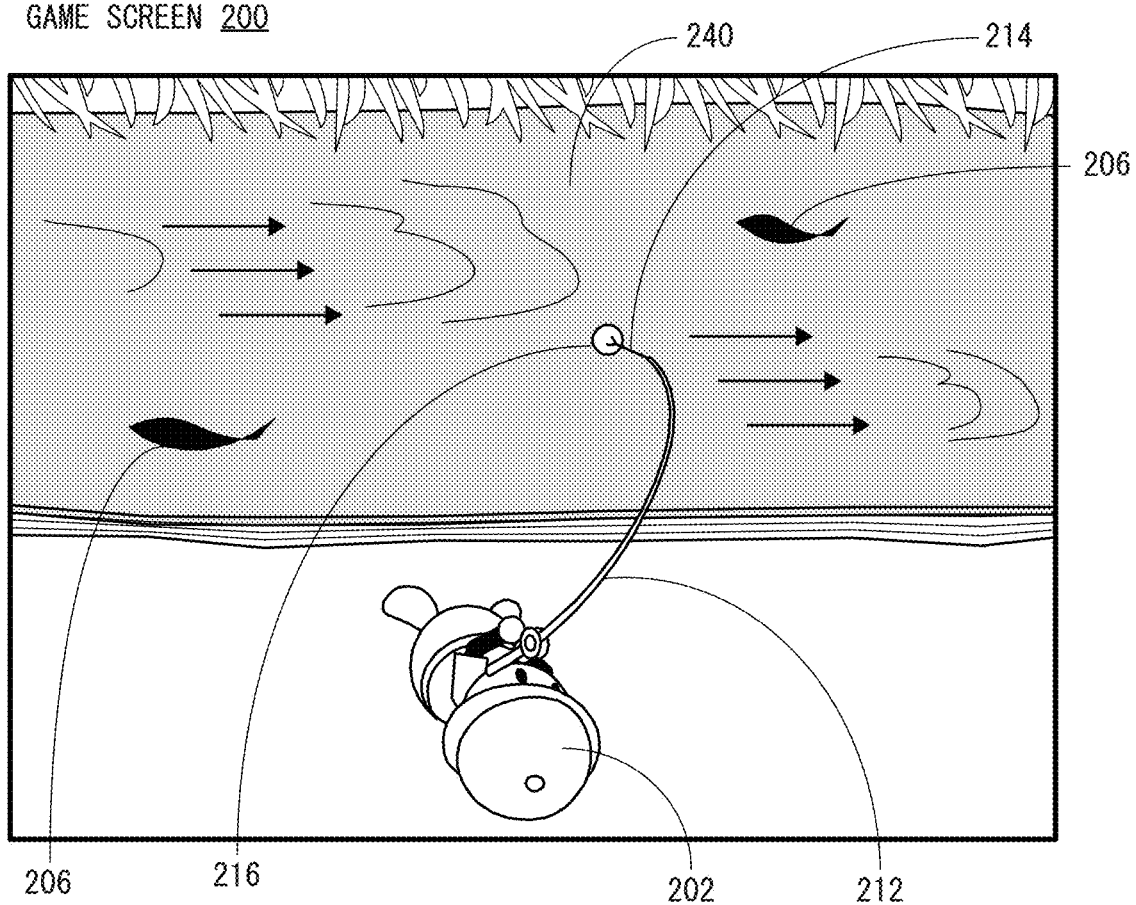
FIG. 13 is an illustration view showing a non-limiting sixth example game image.
Figure 14:
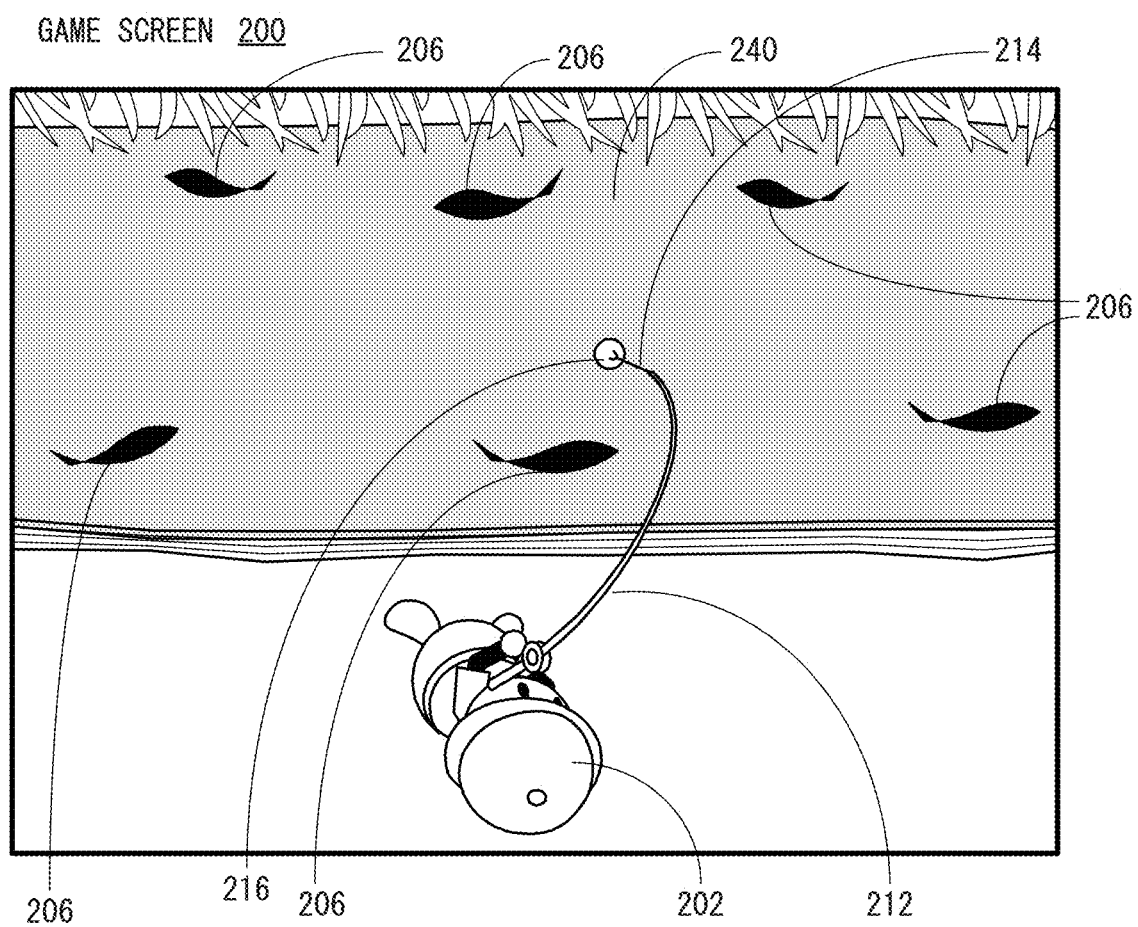
FIG. 14 is an illustration view showing a non-limiting seventh example game image.

FIG. 13 is an illustration view showing a non-limiting example game screen 200 in a case where a water place is determined as a river, and FIG. 14 is an illustration view showing a non-limiting example game screen 200 in a case where a water place is determined as a pond. However, FIG. 13 and FIG. 14 each shows a part of the water place.

When it is determined that the water place is a river, an animation showing a manner that the water flows is played-back as shown in FIG. 13. Although the flow of the river is expressed by arrow marks in the game screen 200 shown in FIG. 13, in fact, arrow marks are not displayed. Moreover, a fish object 206 swims against to a flow of the river. A shadow of the fish object 206 is shown in FIG. 13 (in also FIG. 14). When the player character 202 is caused to perform fishing using a fishing rod 212 based on an operation input of the player, if the player character 202 hangs down a thread 214 in a river, a float 216 attached to the thread 214 is moved to flow according to the flow of the river. However, the float 216 stops at a position according to a length of the thread 214. Moreover, kinds of fishes that can be caught in the river differ from kinds of fishes that can be caught in the pond. In this embodiment, fishes that can be caught in the river may be a sweet fish, a char, a landlocked salmon, etc.

When it is determined that the water place is a pond, the water does not flow as shown in FIG. 14. Moreover, the fish object 206 swims in the pond at random. When the player character 202 is caused to perform fishing using a fishing rod 212 based on an operation input of the player, if the player character 202 hangs down a thread 214 in a pond, a float 216 floats at a position that the thread is hung down. Moreover, in this embodiment, kinds of fishes that can be caught in the pond are a goldfish, a crucian carp, a carp, a catfish, etc.

However, there may be a case where a river or/and a pond is formed in advance in the game field in the virtual space. That is, water is placed also in an area (unit) that the ground is dug in advance. By causing the player character 202 to fill a whole or part of the area where the ground is dug in advance, it is possible to make a whole or part of a river or/and a pond formed in advance into the ground. In also this case, it is possible to deform the terrain.

Thus, when causing the player character 202 to perform fishing based on an operation input of the player, different processing is performed for a river and for a pond. Accordingly, the player can fish a desired fish object 206 by causing the player character 202 to generate a river or a pond. That is, it is possible to enjoy different fishing in a river and a pond.

Figure 15:
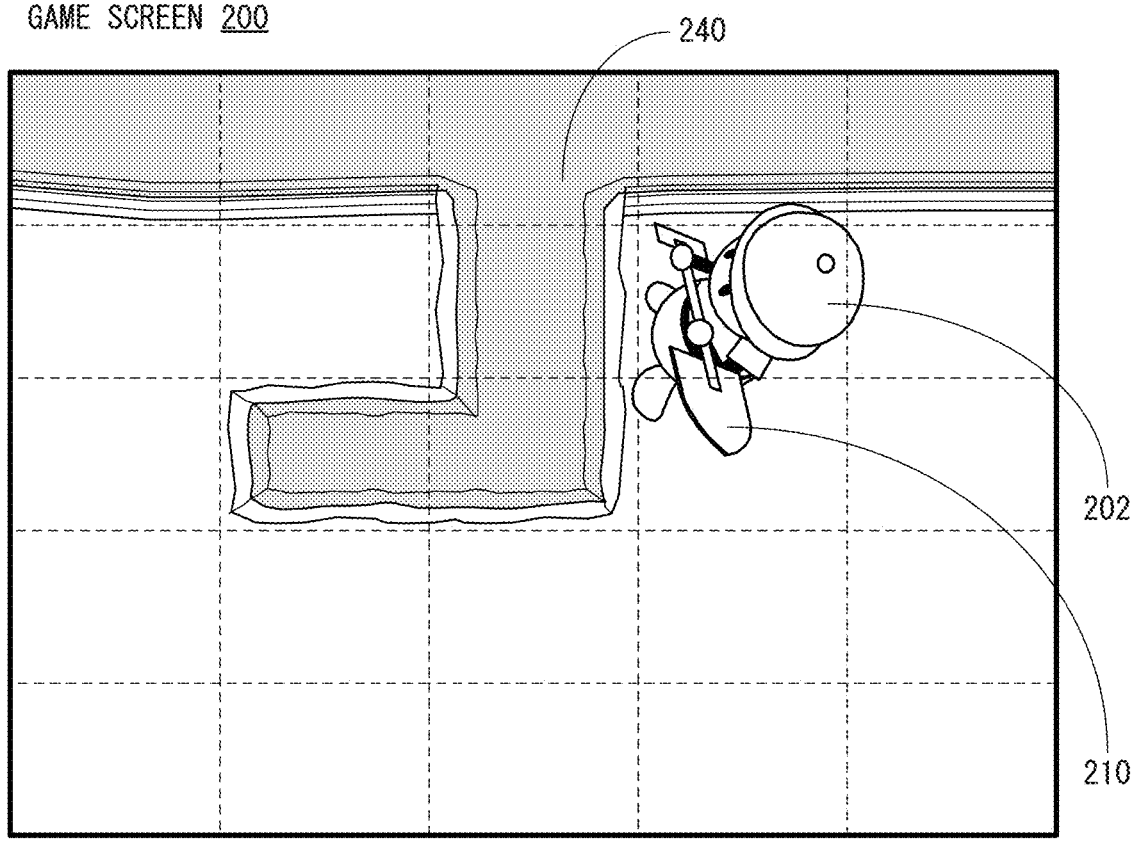
FIG. 15 is an illustration view showing a non-limiting eighth example game image.

Moreover, in the game screen 200 shown in FIG. 12, if the ground between a hole formed by digging the ground and a river is dug, it is possible to connect the hole formed by digging the ground to the river as shown in FIG. 15. In this case, the hole dug by the player character 202 based on an operation input of the player becomes a part of the river.

Next, a method of determining whether a water place is a river or a pond will be described, and further, a method for calculating a flow of water in the water place that is determined to be a river will be described.

As described above, when it is determined that a shape of the water place is a long shape, this water place is determined as a river. In this embodiment, it is determined whether the water place is a river or a pond based on an area of the water place and a distance between a start point and an end point that are set in the water place.

Specifically, it is determined whether the water place is a river or a pond based on whether both of the area S of the water place and the distance (length) d from a water-place unit rendered a start point to a water-place unit rendered an end point set in the water place, satisfy the formula 1. In this embodiment, such determination is made on the assumption that each of vertical length and horizontal length of one (1) unit is "1", and the area of one (1) unit is "1". Therefore, a distance between two units adjacent to each other vertically or horizontally is a distance between the centers of the two units, that is, "1". Then, the distance between the two units in the same water place means the number of the units that is the smallest value or the shortest distance out of distances traveled from the center of one unit of the two units to the center of the other unit by repeatedly moving to a unit adjacent vertically or horizontally, that is, up, down, left or right (i.e., moving one (1) by one (1) in distance) without moving on the ground.

$$d^2 > 4S \qquad \text{[Formula 1]}$$

Thus, it is determined whether the water place is a river (i.e., to have a flow of water) by comparing a parameter of the distance d between the start point and the end point both set in the water place with a parameter of the area S of the water place. In this embodiment, it is determined whether a value obtained by squaring the parameter of the distance d is larger than a reference value (in this embodiment, a value obtained by quadrupling the parameter of area S). This is because that in a square water place, when setting a start point to the upper left water-place unit and an end point to the lower right water-place unit, and it is assumed that a distance (length) from the start point to the end point becomes d, and therefore, the area S of the water place becomes $d^2/4$. That is, when a shape of the water place is a square or approximate a square, $d^2=4S$ is obtained. Therefore, in order to determine that a shape of the water place is a long shape, it needs that the distance d from the start point to the end point is longer than the distance of a case where a shape of the water place is a square, and thus, the formula 1 is derived. However, it may be determined that a shape of the water place is a long shape and thus the water place is a river even when a value squaring the parameter of the distance d is equal to a value quadrupling the parameter of the area S.

Moreover, a water-place unit rendered the start point and a water-place unit rendered the end point are set according to a first rule. In the following, in this specification, a water-place unit rendered the start point is simply referred to as "start point" and a water-place unit rendered the end point is simply referred to as "end point". The first rule includes the following four items (1) to (4). (1) A distance connecting two points (i.e., a distance between two units) needs to be greatest. (2) The start point needs to be located on a north-most side of the water place. (3) The end point needs to be located in a south-most side of the water place. (4) When there are a plurality of sets of the start point and the end point in each of which the distance connecting two points (i.e., the distance between two units) becomes greatest, a set in which the start point is located in a west-most side of the water place is selected, and if there are a plurality of sets in each of which the start point is located in a west-most, a set in which the end point is located in an east-most side of the water place is selected.

However, in this embodiment, when viewing the game field above the virtual space as a bird's-eye view, an upper direction is set north, a down direction is set south, a left direction is set west, and a right direction is set east.

Figure 16A:
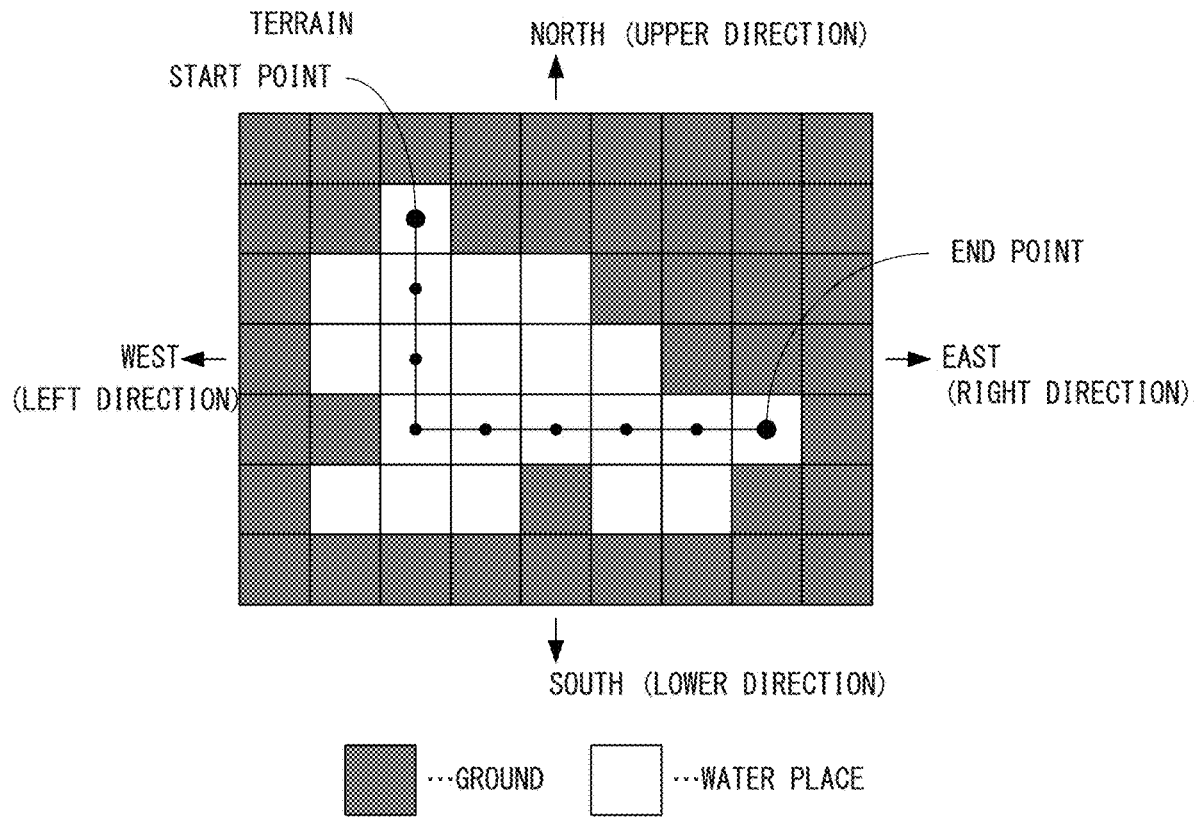
FIG. 16A is an illustration view schematically showing a non-limiting example terrain including a water place.
Figure 16B:
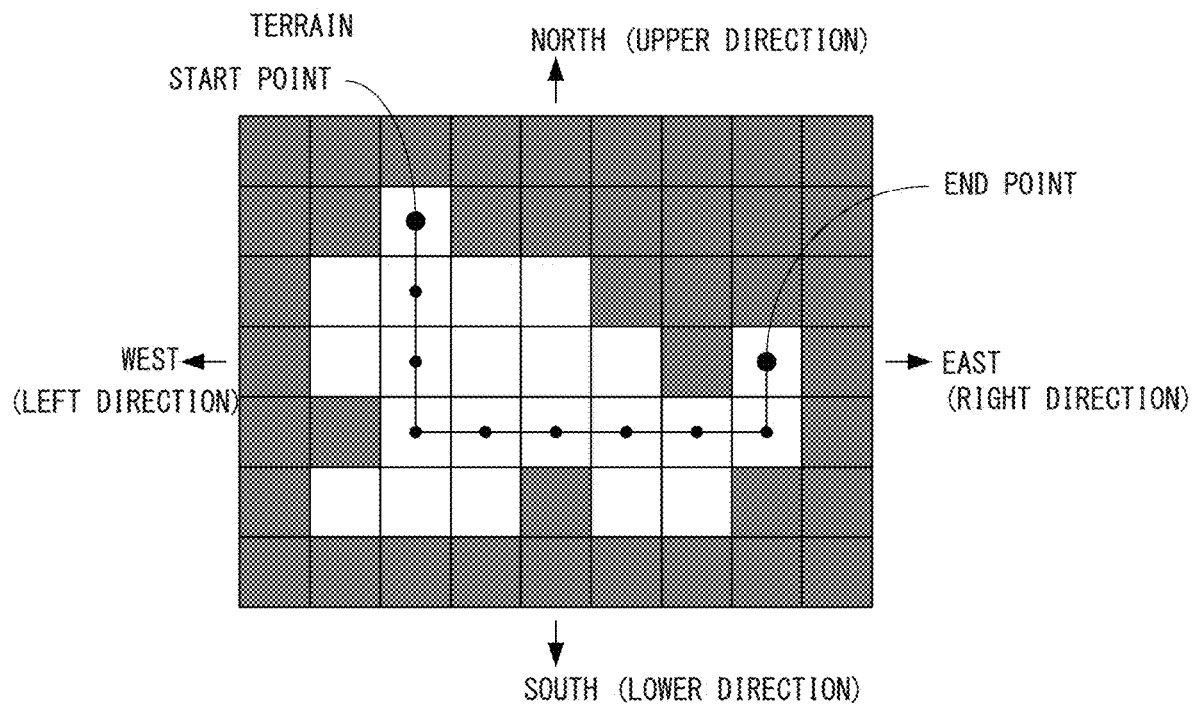
FIG. 16B is an illustration view schematically showing another non-limiting example terrain including a water place.

FIG. 16A is an illustration view schematically showing a non-limiting example terrain divided into a plurality of units for describing a method of determining whether the water place is a river or a pond. FIG. 16B is an illustration view schematically showing another non-limiting example terrain divided into a plurality of units for describing a method of determining whether the water place is a river or a pond. In FIG. 16A and FIG. 16B, a unit filled with gray is a ground (or land) unit, and a unit filled with white is a unit of the water place unit (hereinafter, referred to as "water-place unit"). The same applies to FIG. 17-FIG. 21.

In an example shown in FIG. 16A, the area S of the water place (i.e., the number of the water-place units) is "21", and the distance d connecting the start point and the end point set according to the above-described first rule is "9". In this case, since the formula 1 is not satisfied, it is determined that the water place is a pond.

In an example shown in FIG. 16B, the area S of the water place (i.e., the number of the water-place units) is "22", and the distance d connecting the start point and the end point set according to the above-described first rule is "10". In this case, since the formula 1 is satisfied, it is determined that the water place is a river.

However, when the water place is connected to a waterfall or a brackish water area, a start point and an end point are set by a second rule different from the above-described first rule. The second rule includes following three items (a)-(c). (a) Water-place units connected to a bottom of waterfall are all rendered start points. (b) Water-place units connected to a top of waterfall are all rendered end points. (c) River units connected to brackish water area are all rendered end points.

Therefore, as shown in FIG. 15, when a water place formed by digging the ground by the player character 202 based on an operation input of the player is coupled to a river, a start point and an end point are set according to the second rule. That is, when the water place formed by digging the ground by the player character 202 is connected to a water source such as a top of waterfall, a bottom of waterfall and a brackish water area, a start point and an end point are set according to the second rule regardless of whether a shape of the formed water place is a long shape.

Figure 17:
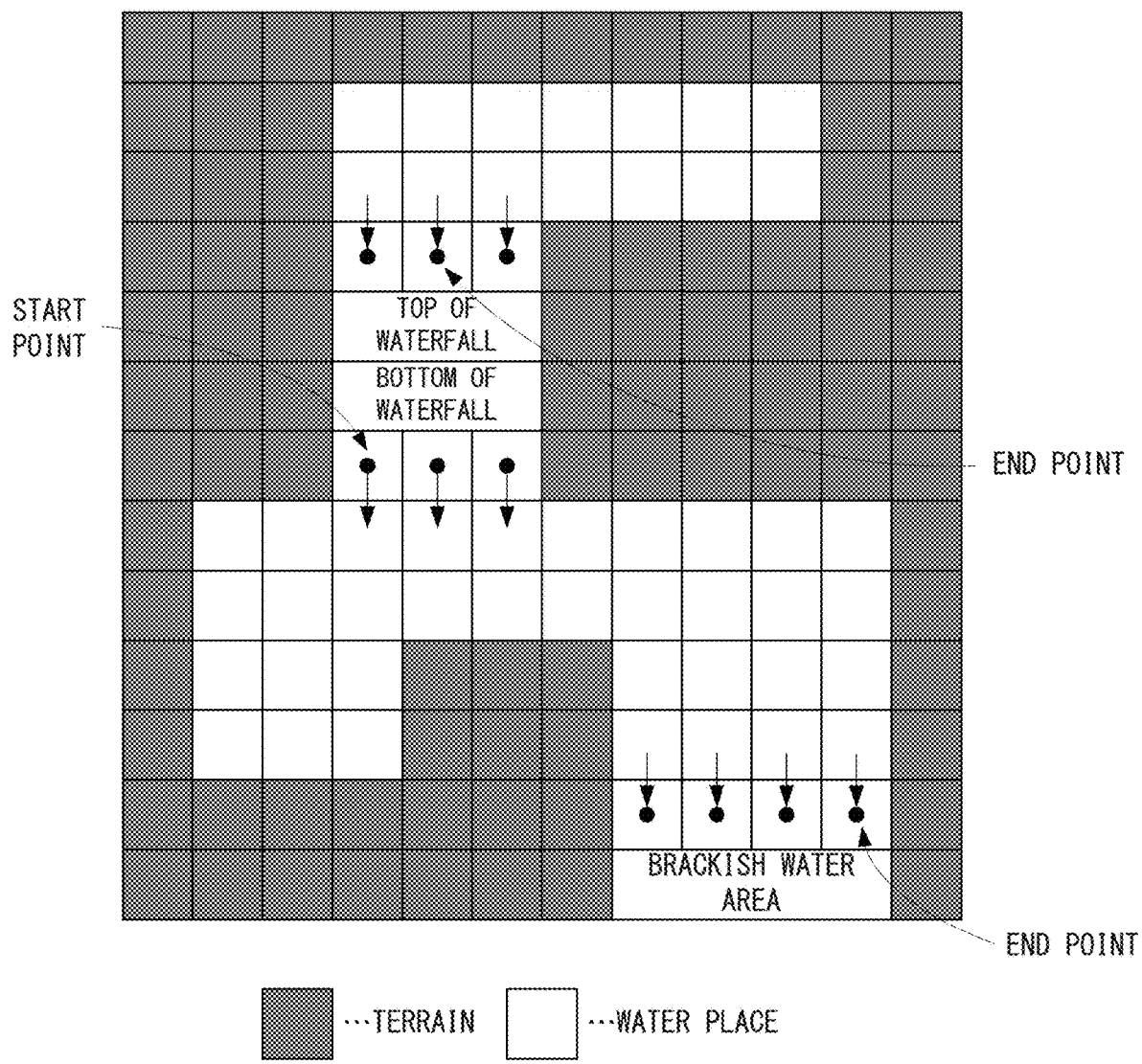
FIG. 17 is an illustration view schematically showing a further non-limiting example terrain including a water place.

FIG. 17 is an illustration view schematically showing a non-limiting example terrain that includes a waterfall (top and bottom) and a brackish water area, and is divided into a plurality of units. Although a plurality of units constituting the top of waterfall, the bottom of waterfall and the brackish water area are respectively located in positions that are set in advance in the game field in the virtual space, these units may be located or changed by the player.

In the terrain as shown in FIG. 17, a start point and an end point are set according to the second rule. That is, as shown in FIG. 17, a plurality of water-place units adjacent to a lower side of the unit of the bottom of the waterfall are all set as start points according to the above-described item (a). Moreover, a plurality of water-place units adjacent to an upper side of the unit of the top of the waterfall are all set as end points according to the above-described item (b). Furthermore, a plurality of water-place units adjacent to an upper side of the unit of the brackish water area are all set as end points according to the above-described item (c).

A flow of water is generated on the basis of the start point and the end point that are thus set as described above. A flow of water is dynamically generated based on a propagating energy. There are two types of energy, energy that flows out of the start point (hereinafter, "outflow energy") and energy that flows into the end point (hereinafter, "inflow energy"), and propagation of the outflow energy and propagation of the inflow energy are calculated separately.

Figure 18A:
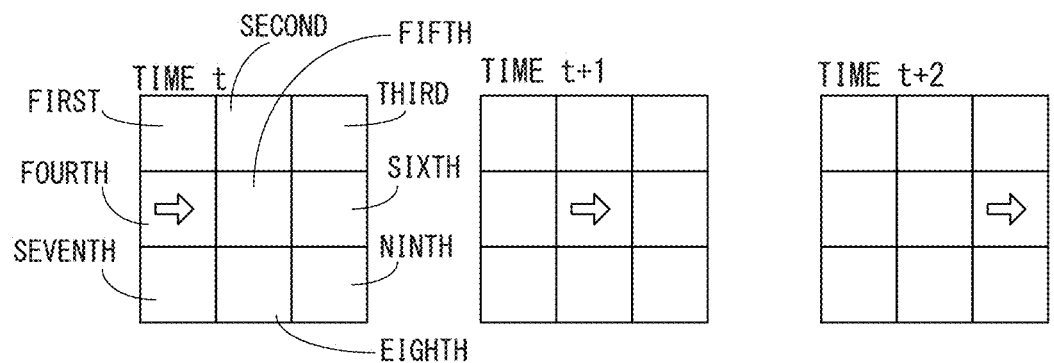
FIG. 18A is an illustration view showing a non-limiting example propagation manner of outflow energy.
Figure 18B:
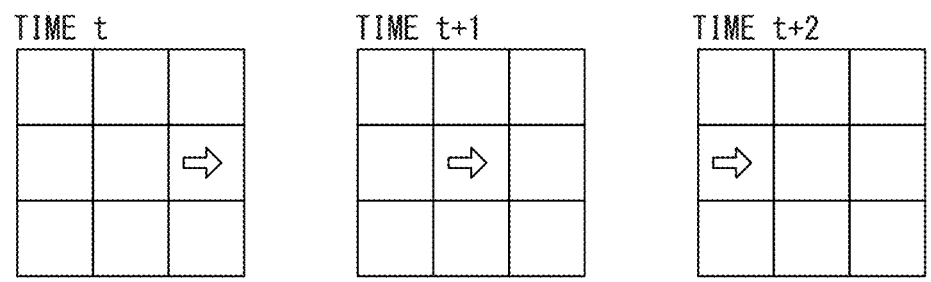
FIG. 18B is an illustration view showing a non-limiting example propagation manner of inflow energy.
Figure 18C:
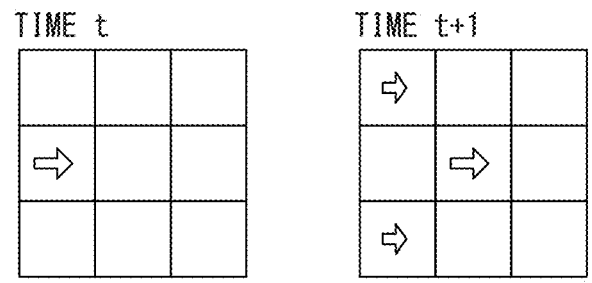
FIG. 18C is an illustration view showing a non-limiting example distribution manner of outflow energy.
Figure 18D:
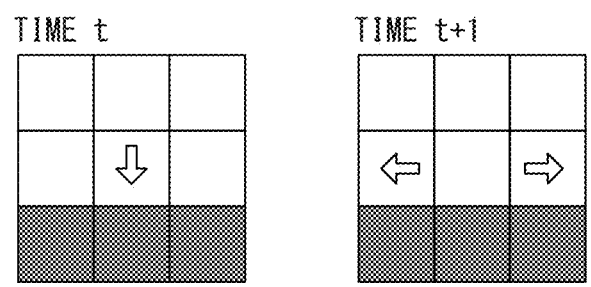
FIG. 18D is an illustration view showing a non-limiting example reflection manner of outflow energy.
Figure 18E:
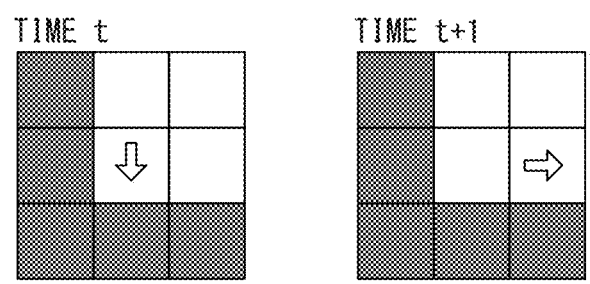
FIG. 18E is an illustration view showing another non-limiting example reflection manner of outflow energy.

FIG. 18A is an illustration view showing a non-limiting example propagation manner of the outflow energy, FIG. 18B is an illustration view showing a non-limiting example propagation manner of the inflow energy, FIG. 18C is an illustration view showing a non-limiting example distribution manner of the outflow energy, FIG. 18D is an illustration view showing another non-limiting example propagation manner of the outflow energy at a time of being reflected by a land, and FIG. 18E is an illustration view showing a further non-limiting example propagation manner of the outflow energy at a time of being reflected by an L-letter-shaped wall (or land).

In examples shown in FIG. 18A-FIG. 18E, a terrain including nine units of longitudinal three (3) units by lateral three (3) units is used. As shown in a view at a left-hand side of FIG. 18A, an upper left unit is called "first unit", a unit adjacent in the right to the first unit is called "second unit", and a unit adjacent in the right to the second unit is called "third unit", in FIG. 18A-FIG. 18E. Moreover, a unit adjacent below to the first unit is called "fourth unit", a unit adjacent in the right to the fourth unit is called "fifth unit", and a unit adjacent in the right to the fifth unit is called "sixth unit", in FIG. 18A-FIG. 18E. Furthermore, a unit adjacent below to the fourth unit is called "seventh unit", a unit adjacent in the right to the seventh unit is called "eighth unit", and a unit adjacent in the right to the eighth unit is called "ninth unit", in FIG. 18A-FIG. 18E.

The outflow energy is propagated in a direction of energy. That is, the outflow energy is propagated to a unit adjacent on the same side as the direction of energy at every time when a predetermined time period (one (1) second, in this embodiment) elapses. In the example shown in FIG. 18A, the outflow energy in the fourth unit at the time t is propagated to the fifth unit at the time t+1. Furthermore, the outflow energy in the fifth unit at the time t+1 is propagated to the sixth unit at the time t+2.

Although in FIG. 18A (also in FIG. 18B-FIG. 18E), only a propagated energy is indicated using arrow marks in order to describe the energy propagation, in fact, the energy is continuously propagated as long as the energy from an energy source (both of a outflow source and an inflow source) is not interrupted and the terrain is not deformed.

In this embodiment, the energy is controlled so that it is not attenuated as a function of a distance from the energy source (both of the outflow source and the inflow source). This is for avoiding that the energy disappears before reaching an opposite stop and thus a flow of water is lost on the way when there is only one energy source and a relatively long water place is formed, for example.

Moreover, the inflow energy is propagated in a direction opposite to a direction of the energy. That is, the inflow energy is propagated to a unit adjacent on the opposite side to the direction of the energy at every time when a predetermined time period (one (1) second, in this embodiment) elapses. In the example shown in FIG. 18B, the inflow energy in the sixth unit at the time t is propagated to the fifth unit at the time t+1. Furthermore, the inflow energy in the fifth unit at the time t+1 is propagated to the fourth unit at the time t+2.

As shown in FIG. 18A and FIG. 18B, the energy is propagated in a direction of energy or in an opposite direction, but in a case of propagation in only each direction, in the area that width is made large on the way, the energy is no longer propagated to a unit of the portion that the width is made large. Therefore, in this embodiment, as shown in FIG. 18C, a part of energy is distributed to each of the units adjacent in the right and left in the propagation direction of energy. In the example shown in FIG. 18C, the outflow energy in the fourth unit at the time t is propagated to the fifth unit at the time t+1. At this time, the outflow energy is divided so that a part thereof is propagated to each of the first unit and the seventh unit.

However, since the energy is distributed from the adjacent unit even when the energy is to be distributed, the energy to be propagated is basically controlled so as not to be attenuated.

FIG. 18D and FIG. 18E are illustration views each showing a non-limiting example reflection manner of the energy in a case where a propagation destination of the energy is land (or the ground). The example of FIG. 18D shows a case where the land is formed to be extended right and left in a straight line in the seventh unit, the eighth unit and the ninth unit, and the outflow energy is propagated in a direction perpendicularly to the land. The example of FIG. 18E shows a case where the land is formed in an L-letter shape in the first unit, the fourth unit, the seventh unit, the eighth unit and the ninth unit, and the outflow energy is propagated in a direction perpendicularly to the land corresponding to a lateral bar of the L-letter.

As shown in FIG. 18D, the land (or the ground) is located in the eighth unit to which the outflow energy is to be propagated from the fifth unit. Therefore, the outflow energy is reflected by the land. In this embodiment, the outflow energy is reflected (or propagated) in a direction along the land. Therefore, as shown in FIG. 18D, after t+1 seconds, the outflow energy is propagated to the fourth unit in the left direction, and propagated to the sixth unit in the right direction.

Moreover, as shown in FIG. 18E, the land (or the ground) is located in the eighth unit to which the outflow energy is propagated from the fifth unit. Therefore, the outflow energy is reflected by the land similar to a case shown in FIG. 18D. However, the land (or ground) is located in the fourth unit. Therefore, as shown in FIG. 18E, after t+1 seconds, the outflow energy is propagated to the sixth unit in the right direction.

However, in a case where on the land (or ground) formed in a U-letter shape, the outflow energy is propagated toward the bottom of the U-letter from the top of the U-letter, the outflow energy propagated to the land is made not to be reflected (propagated) in any directions. This is for avoiding that the outflow energy of a unit of a propagation source is canceled and resulting in an expression like a backflow.

As described above, the propagation of the outflow energy and the propagation of the inflow energy in each of the water-place units constituting the water place are calculated, respectively. If the propagation of the energy is calculated, the propagation of the outflow energy and the propagation of the inflow energy are combined, and a flow of water is calculated based on the propagation of the combined energy. However, the flow of water is calculated for each water place. If the holes are not connected to each other, it is determined that water places are different from each other.

Figure 19A:
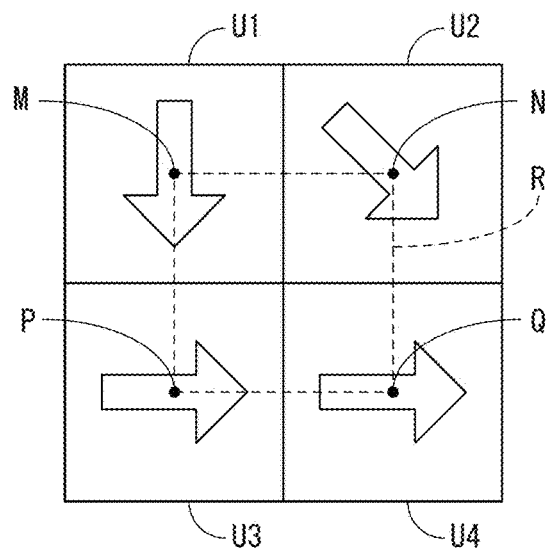
FIG. 19A is an illustration view showing a non-limiting example method of calculating a flow of water in a water-place unit.

As described above, a flow of water is dynamically generated based on the energy to be propagated. Here, a method of generating a flow of water based on the energy to be propagated. FIG. 19A shows four water-place units U1-U4, and a direction of the energy of the flow of water in each of the water-place units U1-U4 is indicated with a white arrow mark. A flow of water in each point within a range R enclosed with dotted lines is calculated (interpolated) by combining vectors set at center points of the four water-place units U1-U4.

The vector set at the center point of each of the water-place units U1-U4 is a vector having a direction that the energy is propagated in each of the water-place units U1-U4 and a predetermined size (for example, "1"). In FIG. 19A, a vector M is set at the center point of the water-place unit U1, a vector N is set at the center point of the water-place unit U2, and a vector P is set at the center point of the water-place unit U3, and a vector Q is set at the center point of the water-place unit U4.

Figure 19B:
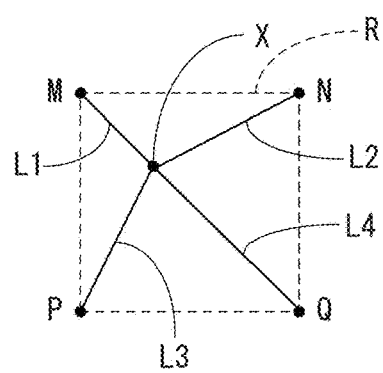
FIG. 19B is another illustration view showing the non-limiting example method of calculating a flow of water in a water-place unit.

As shown in FIG. 19B, a vector, that is, a flow of water at an arbitrary point X within the range R enclosed with dotted lines is calculated by combining the four vectors M, N, and P and Q. However, the sizes of the vectors M, N, P and Q are reduced as distances L1, L2, L3 and L4 with the point X are increased. A direction and a speed that the water flows are determined according to a direction and a size of a vector obtained by combining the vectors M, N, and P and Q (i.e., combined vector). When the size of the vector is "1", a standard speed is set, and the speed is reduced as the size of the vector becomes smaller. However, even when the size of the vector exceeds "1", the speed is not made larger than the standard speed.

Thus, a flow of water in each of the water-place units constituting the water place, that is, a direction and a speed that the water flows are calculated using the vectors set at the centers of the adjacent water-place units.

Figure 19C:
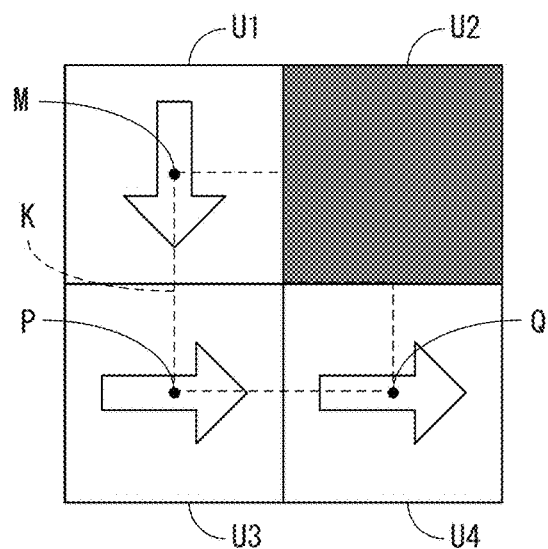
FIG. 19C is an illustration view showing a non-limiting example method of calculating a flow of water in a water-place unit when the ground is set to a part of the units.

However, when the ground is set to one unit among four units, as shown in FIG. 19C, the combined vector in an arbitrary point within a range K (an area of the L-letter) except a portion of a unit that the ground is set from the range R is calculated using the vectors set at the center points of three water-place units. A calculation method of a combined vector is the same as that of a case where the combined vector at an arbitrary point X within the range R is calculated, and is calculated except for a component of a vector set at the center point of the unit where the ground is set.

Although illustration is omitted, when the ground is set to two units among the four units, a combined vector at an arbitrary point in the area except a portion of the units each of which the ground is set from the range R is calculated using the vectors set at the center points of the two water-place units.

Moreover, if the propagated energy reaches an equilibrium state, after that, the flow of water does not change. That is, the flow of water becomes a steady state. However, since it takes some time for the propagated energy to reach the equilibrium state, in this embodiment, when the player character 202 enters a scene of the water place, initial values of the flows of water in a state approximately the same as a case where the energy reaches the equilibrium state are set. This is because, in a relatively large (long) water place, it takes a long time for energy to be propagated, and in some cases, it takes time for the water to start flowing.

Here, a method of setting the initial values of the flows of water is described. FIG. 20A is an illustration view showing a non-limiting example distance map with respect to a start point in a plurality of water-place units constituting the water place. The distance map means a map that a distance to a water-place unit to be noted from a reference water-place unit is expressed by a numeral value.

In the distance map of FIG. 20A, a water-place unit of the start point is set to a reference water-place unit, and a distance of this water-place unit of a start point itself is set to "0". Since a distance between the adjacent two units is "1" as described above, a distance of a water-place unit adjacent to the water-place unit of the start point is set to "1". A distance of a water-place unit adjacent to the water-place unit that the distance is set to "1" is set to "2". A distance of a water-place unit adjacent to the water-place unit that the distance is set to "2" is set to "3". By repeating this, the distances from the water-place unit of the start point are set to all the water-place units.

If the distances from the water-place unit of the start point are set to all the water-place units and the distance map is generated, initial values of the flows of water by the start point are set. In the distance map with respect to the start point, if the numerical values of the same distance are set to the adjacent water-place units, no flow of water is generated. Moreover, if the numerical values of the different distances are set to the adjacent water-place units in the distance map with respect to the start point, a flow of water from the water-place unit having a small numeral value to the water-place unit having a large numeral value is generated. Such processing is executed for all the water-place units. As to the distance map shown in FIG. 20A, flows of water are generated as shown in FIG. 20B. In FIG. 20B, the flow of water between two adjacent water-place units is indicated by an arrow mark. The same applies FIG. 21B.

FIG. 21A is an illustration view showing a non-limiting example distance map with respect to an end point in a plurality of water-place units constituting the water place. In the distance map of FIG. 21A, a water-place unit of the end point is set to a reference water-place unit, and a distance of this water-place unit of end point itself is set with "0". As understood from FIG. 21A, the distance of a water-place unit adjacent to the water-place unit of the end point is set to "1", and distances of respective water-place units are set similar to the distance map with respect to the start point shown in FIG. 20A.

If the distances from the water-place unit of the end point are set to all the water-place units and the distance map is generated, the initial values of the flows of water by the end point are set. In also the distance map with respect to the end point, if the numerical values of the same distance are set to the adjacent water-place units, no flow of water is generated. However, in the distance map with respect to the end point, a flow of water from the water-place unit having a large numeral value to the water-place unit having a small numeral value is generated. As to the distance map shown in FIG. 21A, flows of water are generated as shown in FIG. 20B.

If the initial values of the flows of water by the start point and the initial values of the flows of water by the end point are set, these initial values are combined and an initial value of the flow of water of each of the water-place units in the water place is determined. Moreover, the flow of water of each point in each of the water-place units constituting the water place is calculated (or interpolated) similar to a case where FIG. 19A and FIG. 19B are shown.

As described above, when the player character 202 enters a scene of the water place, initial values of the flows of water in the water place are determined, and an animation that the water flows is played-back based on the determined initial values of the flows of water during a predetermined time period (30 frames, for example).

However, a frame is a unit time period for updating a screen, and one (1) frame is $1/30$ seconds in this embodiment. This is an example, and one (1) frame may be $1/60$ seconds or $1/120$ seconds.

During the predetermined time period, the flows of water based on propagation of the outflow energy and propagation of the inflow energy are calculated for each frame, flows of water based on the distance map is gradually changed to the flows of water based on the propagation of energy.

Moreover, if the shape of the water place is changed based on an operation input of the player, the start point and the end point are newly set, and it is newly determined whether a shape of the water place that is deformed or newly formed according to change of the shape of the water place is a long shape.

When the shape of the water place that is deformed or newly formed is a long shape, propagation of the inflow energy from the newly set start point is calculated and propagation of the outflow energy from the newly set end point is calculated. A flow of water is calculated according to propagation of the energy obtained by combining the propagation of the inflow energy and the propagation of the outflow energy. However, since there is a sense of incongruity if sudden change occurs in the flow of water after the terrain is changed from the flow of water before the terrain is changed, the flow of water for each point is controlled so that the flow of water is changed gradually. Thus, when the terrain is changed and thus the flow of water is changed, since the energy becomes an equilibrium state and thus it takes a time until the flow of water becomes a steady state, only when the terrain is changed, the propagation of the energy is calculated every frame within a predetermined time period (in this embodiment, one (1) second), thereby shortening the time until the energy reaches the equilibrium state and thus the flow of water becomes the steady state.

Figure 22:
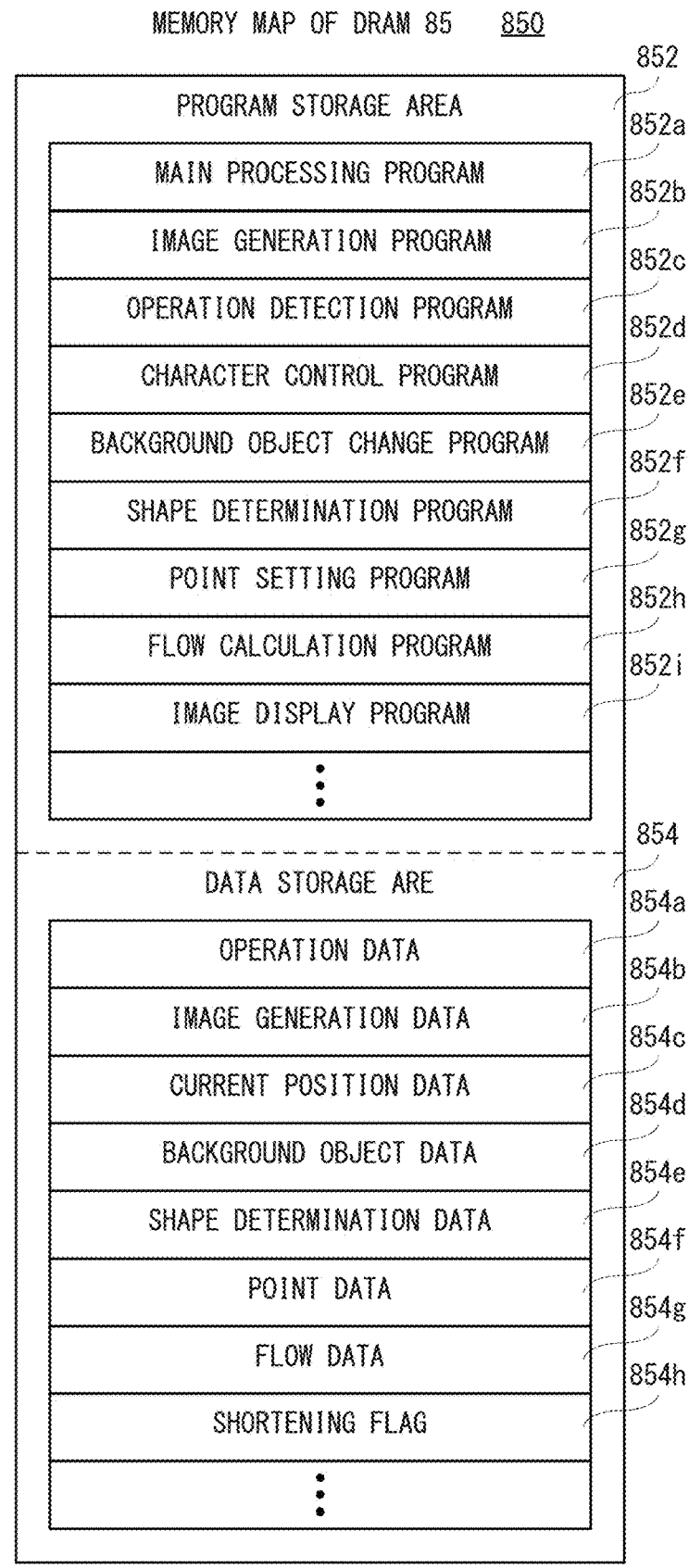
FIG. 22 is an illustration view showing a non-limiting example memory map of a DRAM of the main body apparatus shown in FIG. 6.

Moreover, when a shape of the water place that is deformed or newly formed is not a long shape, there is no flow of water in this water place. However, since there is a sense of incongruity if the flow of water is made to be suddenly dispersed after the change of the terrain when there was the flow of water before the change of the terrain, the flow of water for each point is controlled so that the flow of water is dispersed gradually. FIG. 22 is an illustration view showing a non-limiting example memory map 850 of the DRAM 85 shown in FIG. 6. As shown in FIG. 22, the DRAM 85 includes a program storage area 852 and a data storage area 854. The program storage area 852 is stored with a program of a game application (i.e., game program). As shown in FIG. 22, the game program includes a main processing program 852*a*, an image generation program 852*b*, an operation detection program 852*c*, a character control program 852*d*, a background object change program 852*e*, a shape determination program 852*f*, a point setting program 852*g*, a flow calculation program 852*h*, an image display program 852*i*, etc.

However, a function of displaying images such as a generated game image is a function that the main body apparatus 2 is provided with. Therefore, the image display program 852*i* is not included in the game program.

Although detailed description is omitted, at a proper timing after a power of the main body apparatus 2 is turned on, a part or whole of each of the programs 852*a*-852*h* is read from the flash memory 84 or/and a storage medium attached to the slot 23 so as to be stored in the DRAM 85. However, a part or whole of each of the programs 852*a*-852*h* may be acquired from other computers capable of performing communication with the main body apparatus 2. Moreover, at a proper timing after the power of the main body apparatus 2 is turned on, the image display program 852*i* is read from the flash memory 84 so as to be stored in the DRAM 85.

The main processing program 852*a* is a program for executing overall game processing of a virtual game of this embodiment. The image generation program 852*b* is a program for generating, using image generation data 854*b*, display image data corresponding to various kinds of images such as a game image.

The operation detection program 852*c* is a program for acquiring the operation data 854*a* from the left controller 3 or/and the right controller 4. That is, the operation data 854*a* according to an operation input by the player is acquired.

The character control program 852*d* is a program for controlling an action or motion of the player character 202 based on an operation input of the player, and controlling an action or motion of the non-player character regardless of an operation input of the player.

The background object change program 852*e* is a program, mainly in this embodiment, for digging the terrain according to a digging action of the player character 202 and for filling a hole or a water place according to a burying action of player character 202. That is, the background object change program 852*e* is a program for mainly deforming the terrain according to an action of the player character 202. Therefore, according to the background object change program 852*e*, a house, a wall or a bridge may be built or a house, a wall or a bridge may be removed.

The shape determination program 852*f* is a program for determining whether a shape of the water place is a long shape when the terrain is deformed. The point setting program 852*g* is a program for setting a start point or/and an end point according to a predetermined rule (i.e., the first rule or second rule) in a plurality of water-place units constituting the water place.

The flow calculation program 852*h* is a program for calculating a flow of water (a direction and a speed of a flow of water in each point) in each water-place unit based on outflow energy and inflow energy in the water place. Moreover, the flow calculation program 852*h* is also a program for calculating the initial values of the flows of water when the player character enters a scene of the water place by generating the distance map with respect to the start point and the distance map with respect to the end point, and combining these distance maps.

The image display program 852*i* is a program for outputting to a display the display image data generated according to the image generation program 852*b*. Therefore, the images (i.e., the game screen 200, etc.) corresponding to the display image data are displayed on the display such as the display 12.

In addition, the program storage area 852 is further stored with a sound output program for outputting a sound such as a BGM, a communication program for performing communication with other apparatuses, a backup program for storing data in a nonvolatile storage medium such as the flash memory 84, etc.

Moreover, the data storage area 854 is stored with operation data 854*a*, image generation data 854*b*, current position data 854*c*, background object data 854*d*, shape determination data 854*e*, point data 854*f*, flow data 854*g*, a shortening flag 854*h*, etc.

The operation data 854*a* is operation data received from the left controller 3 or/and the right controller 4. In this embodiment, when the main body apparatus 2 receives the operation data from both the left controller 3 and the right controller 4, the main body apparatus 2 stores the operation data 854*a* classified into the left controller 3 and the right controller 4, respectively.

The image generation data 854*b* is data required for generating an image, such as polygon data and texture data. Moreover, the texture data includes data for displaying the flow of water by an animation.

The current position data 854*c* is data of the position coordinates of the characters or the objects capable of moving in the virtual space at the current frame, such as the player character 202 and the non-player characters including the fish object 206, etc.

The background object data 854*d* is data about the background object 204 arranged in the virtual space, specifically, including data of the polygon and the texture constituting the background object 204, and data of the position coordinates of arranging position of the background object 204 in the virtual space.

The shape determination data 854*e* is data about a result of having determined whether the shape of the water place formed or deformed by the player character 202 is a long shape. When there are two or more water places formed or deformed by the player character 202, a result determined for each water place is stored.

The point data 854*f* is data indicating identification information about the start point and the end point that are set according to the point setting program 852*g* and position coordinates data of the start point and the end point. However, when there are two or more water places, for each of the water places, the identification information about the start point and the end point and data of the position coordinates of the start point and the end point are stored as the point data 854*f*.

The flow data 854*g* is data about the flow of water (the direction and the speed that the water flows for each point) for each water-place unit, calculated according to the flow calculation program 852*h*.

The shortening flag 854*h* is a flag for determining whether the time in a state where the flow of water is not changed with time, that is, the time until the flow of water reaches a steady state should be shortened. When shortening time until the flow of water reaches the steady state, the shortening flag 854*h* is turned on, and when not shortening time until the flow of water reaches the steady state, the shortening flag 854*h* is turned off.

Although illustration is omitted, the data storage area 854 is stored, for executing the game program, with other data required, and provided with other flags and other timers (counters).

Figure 23:
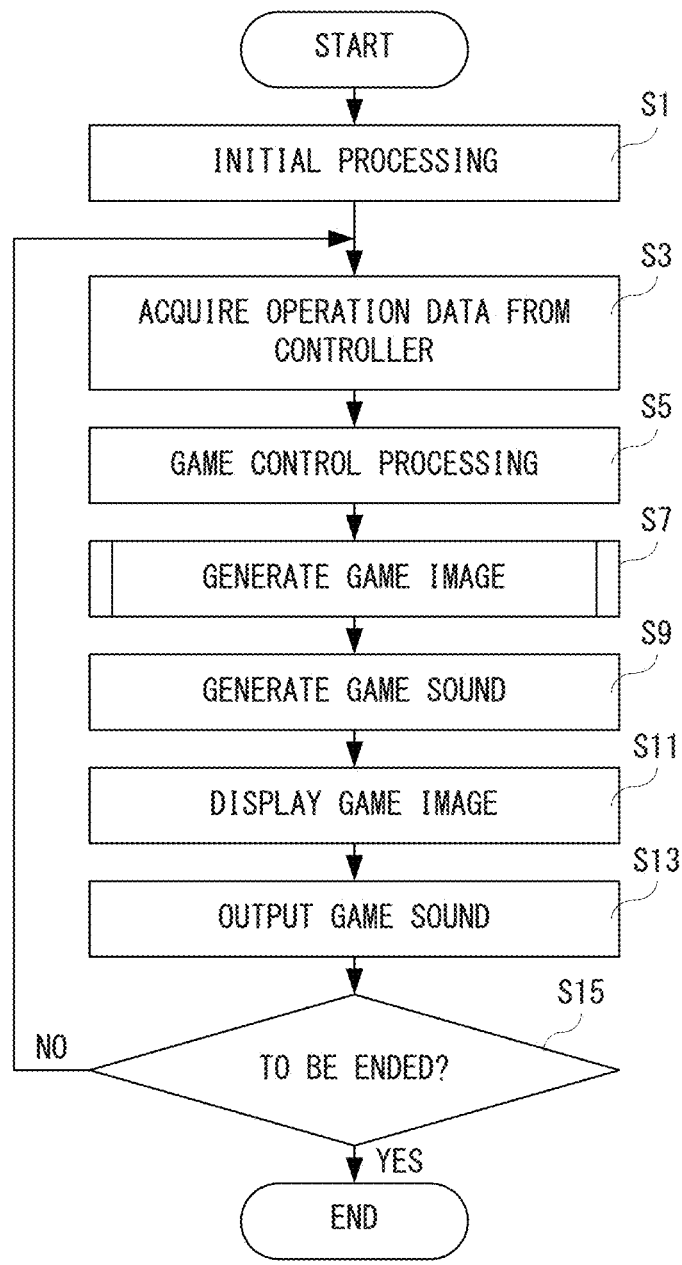
FIG. 23 is a flow chart showing non-limiting example overall game processing of the processor of the main body apparatus shown in FIG. 6.

FIG. 23 is a flowchart showing non-limiting example processing of the game program (overall game processing) by the processor 81 (or computer) of the main body apparatus 2. Although the overall game processing is described using FIG. 23 in the following, duplicate description for a step(s) executing the same processing will be omitted.

However, processing of respective steps of the flowchart shown in FIG. 23 (also in FIG. 24-FIG. 26) are mere examples, and if the same or similar result is obtainable, an order of the respective steps may be exchanged. Moreover, in this embodiment, it will be described that the processor 81 basically executes the processing of each step of the flowcharts shown in FIG. 23-FIG. 26; however, some steps may be executed by a processor(s) or/and a dedicated circuit(s) other than the processor 81.

When a power of the main body apparatus 2 is turned on, prior to execution of the overall game processing, the processor 81 executes a boot program stored in a boot ROM not shown, whereby respective units including the DRAM 85, etc. are initialized. The main body apparatus 2 starts the overall game processing when the execution of the game program of this embodiment is instructed by the user.

As shown in FIG. 23, when the overall game processing is started, the processor 81 executes initial processing in a step S1. In the initial processing, for example, the processor 81 constructs a virtual space for generating and displaying the game screen 200, and arranges the player character 202, the non-player character(s) and the background object(s) 204 that appear in this virtual space at their initial positions. Moreover, the processor 81 sets the initial values of various parameters used by game control processing (S5).

In addition, although detailed description is omitted, prior to the start of the overall game processing, it is determined whether the left controller 3 and the right controller 4 are attached to the main body apparatus 2, and when the left controller 3 and the right controller 4 are detached from the main body apparatus 2, pairing processing between the main body apparatus 2, and the left controller 3 and the right controller 4 is executed.

Subsequently, the processor 81 acquires the operation data transmitted from the controller(s) (3, 4) in a step S3, and executes the game control processing in a step S5. For example, in the game control processing, an arbitrary actions such as moving of the player character 202 according to the operation data is performed. Moreover, an arbitrary action such as moving of the non-player character is performed according to the game program. In a scene of a water place, an action that the fish object 206 moves (i.e., swims) is performed. In this case, if the water place is a river, the fish object 206 is moved against to the flow of the river, and if the water place is a pond, the fish object 206 is moved at random. Furthermore, as necessary, it makes an item appear (be arranged) in the virtual space or disappear (be removed). In a scene of the water place, when causing the player character 202 to perform fishing, if the water place is a river, the float 216 is moved so as to flow according to the flow of the river.

In a next step S7, the processor 81 generates the game image to be displayed on the display 12. Briefly described, the processor 81 generates game image data by reading the data indicating a result of the game control processing in the step S5 and the image generation data 854*b* from the DRAM 85.

Furthermore, in a step S9, the processor 81 generates a game sound to be output to the speaker 88. Briefly described, the processor 81 generates game sound data by reading the data indicating a result of the game control processing in the step S5 and the sound data from the DRAM 85.

The game image data generated in the step S7 is output to the display 12 in a step S11, and the game sound data generated in the step S9 is output to the speaker 88 through the codec circuit 87 in a step S13. However, the game sound data may be output to the sound input/output terminal 25.

Then, it is determined, in a step S15, whether the game is to be ended. The determination in the step S15 is executed based on, for example, whether the game is over, or whether the player gives an instruction to stop the game. If "NO" is determined in the step S15, that is, if the game is not to be ended, the process returns to the step S3. If "YES" is determined in the step S15, that is, if the game is to be ended, the overall game processing is terminated.

Figure 24:
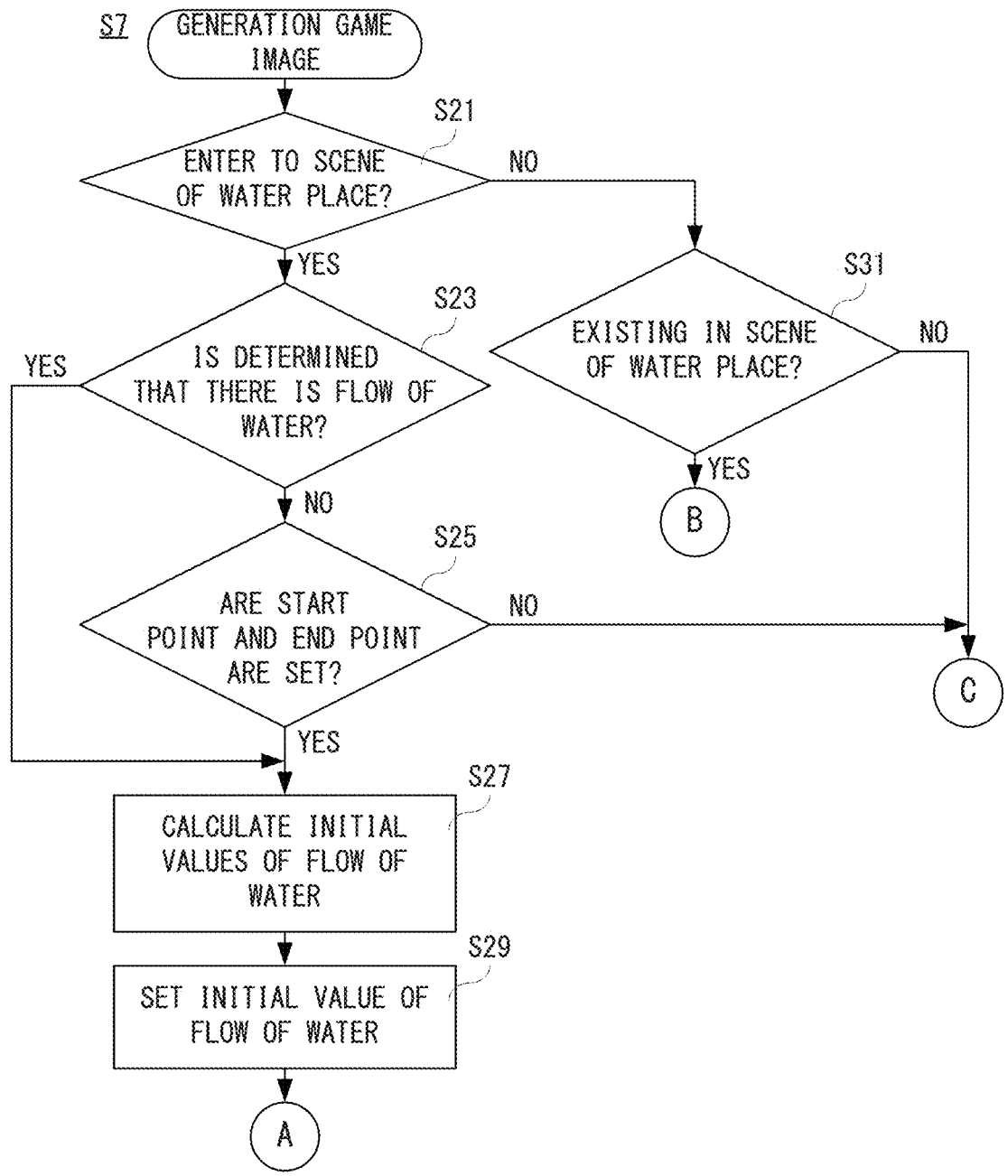
FIG. 24 is a flow chart showing a part of non-limiting example game image generation processing of the processor of the main body apparatus shown in FIG. 6.
Figure 25:
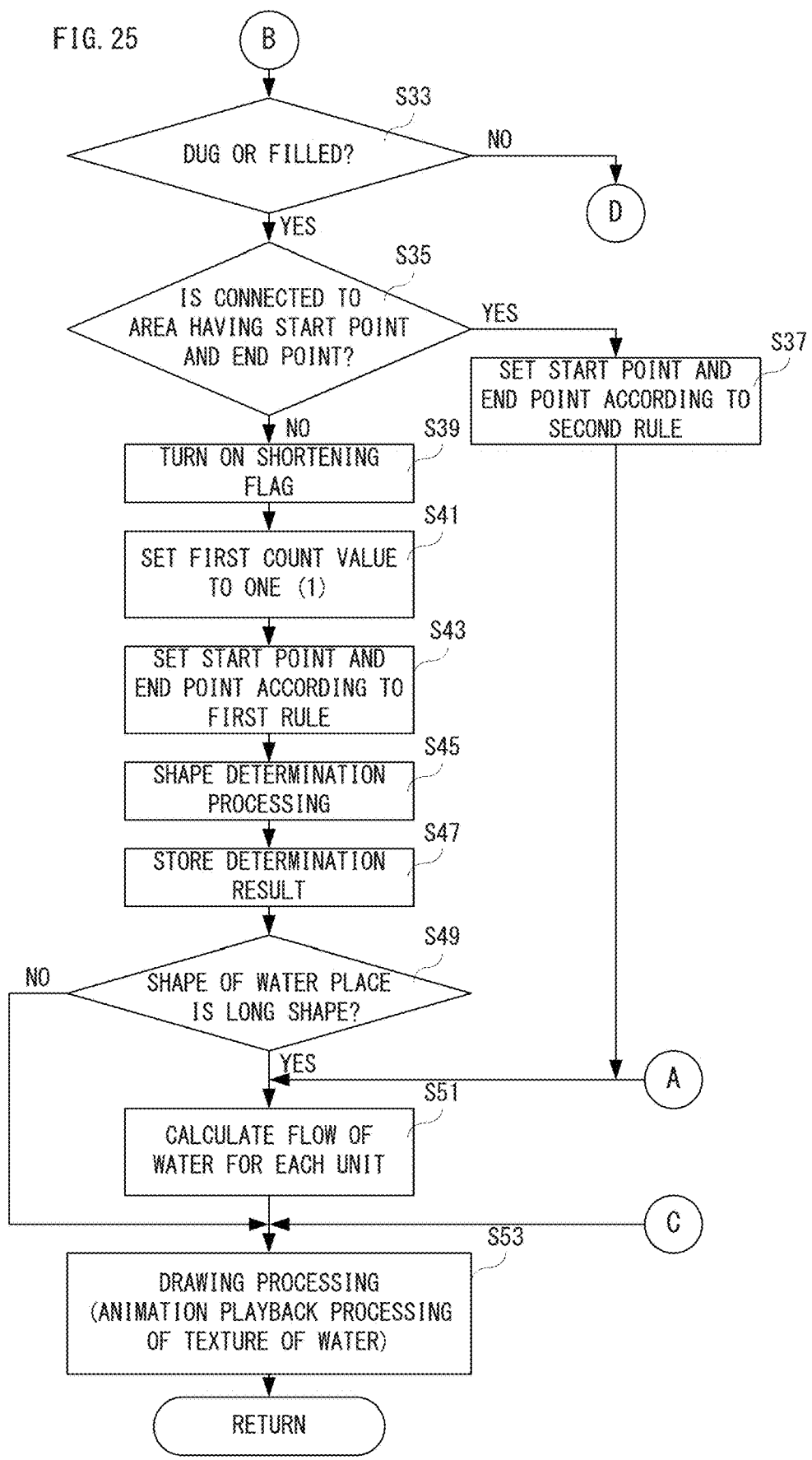
FIG. 25 is a flow chart showing another part of the non-limiting example game image generation processing of the processor of the main body apparatus shown in FIG. 6, following FIG. 24.

FIG. 24-FIG. 26 are flow charts showing non-limiting example game image generation processing shown in FIG. 23 of the processor 81 (or computer) of the main body apparatus 2.

As shown in FIG. 24, when the game image generation processing is started, the processor 81 determines, in a step S21, whether the player character 202 enters a scene of the water place. If "NO" is determined in the step S21, that is, if not entering the scene of the water place, the process proceeds to a step S31 described later. On the other hand, if "YES" in the step S21, that is, if entering the scene of the water place, it is determined, in a step S23, whether determination processing on whether there is a flow of water of a water place in the entered scene of the water place (hereinafter, referred to as the "water place concerned") is executed. Here, the processor 81 determines whether it is determined on whether a shape of the water place concerned is a long shape, with reference to the shape determination data 854*e*.

If "YES" is determined in the step S23, that is, if it is determined whether there is a flow of water in the water place concerned, the process proceeds to a step S27. On the other hand, if "NO" is determined in the step S23, that is, if it is not determined whether there is a flow of water in the water place concerned, it is determined, in a step S25, whether a start point and an end point are set in the water place concerned. That is, it is determined whether the water place concerned includes the water source located in advance in the game field.

If "NO" is determined in the step S25, that is, if a start point and an end point are not set in the water place concerned, the process proceeds to a step S53 shown in FIG. 25. On the other hand, if "YES" is determined in the step S25, that is, if the start point and the end point are set in the water place concerned, in the step S27, the distance map with respect to the start point and the distance map with respect to the end point are calculated and the initial values of the flow of water are calculated. In a subsequent step S29, the initial value of the flow of water is set for each of the water-place units, and the process proceeds to a step S51.

Moreover, it is determined, in the step S31, whether the player character 202 exists in the scene of the water place. If "NO" is determined in the step S31, that is, if the player character 202 does not exist in the scene of the water place, the process proceeds to the step S53 shown in FIG. 25. On the other hand, if "YES" is determined in the step S31, that is, if the player character 202 exists in the scene of the water place, it is determined, in a step S33 shown in FIG. 25, whether the ground is dug or filled. That is, processor 81 determines whether the background object 204 is changed (i.e., whether the terrain is deformed) by the player character 202.

If "NO" is determined in the step S33, that is, if the ground is not dug or filled, the process proceeds to a step S55 shown in FIG. 26. On the other hand, if "YES" is determined in the step S33, that is, if the ground is dug or filled, it is determined, in a step S35, whether the water place concerned is connected to the area where the start point and the end point are set (i.e., a river where the water source is located).

If "YES" is determined in the step S35, that is, the water place concerned is connected to the area where the start point and the end point are set, in a step S37, a start point and an end point are set according to the second rule, and the process proceeds to the step S51. On the other hand, if "NO" is determined in the step S35, that is, if the water place concerned is not connected to the area where the start point and the end point are set, the shortening flag 854$h$ is turned on in a step S39, and a first count value is set to "1" in a step S41. However, the first count value is a variable for counting the predetermined period that the flow of water for each unit is calculated (in this embodiment, one (1) second (30 frames)), in order to shorten the time until reaching the steady state.

In a next step S43, a start point and an end point are set according to the first rule. In a next step S45, the shape determination processing is executed. Here, as described above, the processor 81 calculates the area S of the water place concerned and the distance d from the start point to the end point, and determines whether the formula 1 is satisfied. In a subsequent step S47, a result of determination in the step S45 is stored. That is, the processor 81 stores the shape determination data 854$e$ about the water place concerned.

Subsequently, it is determined, in a step S49, whether a shape of the water place concerned is a long shape. If "NO" is determined in the step S49, that is, if a shape of the water place concerned is not a long shape, the process proceeds to the step S53. On the other hand, if "YES" is determined in the step S49, that is, if a shape of the water place concerned is a long shape, it is determined that there is a flow of water, and in the step S51, a flow of the water in the water place concerned is calculated for each unit, and the process proceeds to the step S53.

Then, in the step S53, the drawing processing is executed, and the game image generation processing of the game image is ended, and the process returns to the overall game processing. In the drawing processing in the step S53, the processor 81 draws not only the water place concerned but also the player character 202, the background objects 204 other than the water place concerned, the fish object 206, etc. Moreover, in the scene of the water place, when causing the player character 202 to perform fishing based on an operation input of the player, the fishing rod 212, the thread 214 and the float 216 are also drawn. Furthermore, when there is a flow of water in the scene of the water place, playback processing that plays-back an animation of the texture of water is performed. Moreover, in the scene of the water place, playback processing that plays-back an animation that the fish object 206 swims is also performed. However, when it is not a scene of a water place, the water place is not drawn and an animation is also not played-back. Moreover, regardless of whether it is a scene of a water place, when causing the player character 202 to dig the ground based on an operation input of the player, the shovel 210 is also drawn.

As shown in FIG. 26, it is determined, in the step S55, whether the shortening flag 854$h$ is turned on. If "YES" is determined in the step S55, that is, if the shortening flag 854$h$ is turned on, the first count value is incremented by one (1) in a step S57, and it is determined, in a step S59, whether the first count value is equal to or more than "30". That is, it is determined whether the predetermined time period for shortening the time until the flow of water reaches a steady state elapses.

If "NO" is determined in the step S59, that is, if the first count value does not reach "30", the process proceeds to the step S51 shown in FIG. 25. On the other hand, if "YES" is determined in the step S59, that is, if the first count value is equal to or more than "30", the shortening flag 854$h$ is tuned off in a step S61, and then, the process proceeded to the step S53.

Moreover, if "NO" is determined in the step S55, that is, if the shortening flag 854$h$ is turned off, the second count value is incremented by one (1) in a step S63, and it is determined, in a step S65, whether the second count value is equal to or more than "30". The second count value is a variable for counting the number of the frames corresponding to one (1) second, in order to propagate the outflow energy and the inflow energy to the adjacent units for every one (1) second. If "NO" determined in the step S65, that is, if the second count value is less than "30", the process proceeded to the step S53. On the other hand, if "YES" is determined in the step S65, that is, if the second count value is equal to or more than "30", the second count value is set to "0" in a step S67, and the process proceeds to the step S51.

According to this embodiment, it is possible to deform the terrain by causing the player character to dig or fill the ground based on an operation input of the player, and the water is placed in the hole that is formed by digging the ground to form the water place, and the flow of water is generated according to whether a shape of the water place is a long shape, and therefore, it is possible to deform the terrain and generate the flow of water in the deformed terrain.

Moreover, according to this embodiment, since the presence or absence of the flow of water is determined according to the terrain and processing according to the presence or absence of the flow of water is executed, it is possible to provide the player with pleasure of deforming the terrain.

In addition, in this embodiment, the water (object) is placed as a fluid object in the hole and the water is allowed to flow when it is determined that a shape of the water place (hole) is a long shape, but the fluid object does not need to be limited to the water object. The same applies a case where another fluid object, such as a flow of lava (or magma), sand (sand flow) and clouds, is placed. In addition, although sand is not a fluid, in the game, the sand may be treated as a fluid, and this embodiment can be applied to such a case. Moreover, there is no necessity of forming a hole when placing clouds, and in the air in the virtual space, a plurality of clouds having a size corresponding to a unit may be combined to form a long-shaped cloud.

Moreover, although the ground is dug or filled using the shovel in this embodiment, it does not need to be limited to this. The ground may be deformed or the ground may simply disappear according to an operation input of the player or a game event. Moreover, it is possible to dig the ground using tools other than a shovel. For example, the ground can be dug by blasting. However, by blasting a rock buried in the ground, the rock may disappear and a hole may appear.

Furthermore, although the game system 1 is shown as an example of an information processing system in this embodiment, the structure thereof should not be limited, and it is possible to adopt other structure. For example, although the above-described "computer" is a single computer (specifically, processor 81) in the above-described embodiment, the "computer" may be a plurality of computers in another embodiment. The above-described "computer" may be (a plurality of) computers provided on a plurality of devices, and more specifically, the above-described "computer" may be constituted by the processor 81 of the main body apparatus 2 and communication control units (microprocessors) 101 and 111 provided on the controllers.

Furthermore, in another embodiment, the game control processing, the game image generation processing and the game sound generation processing shown in FIG. 23-FIG. 26 may be performed in a server on a network such as the internet. In such a case, the processor 81 of the main body apparatus 2 transmits the operation data received from the left controller 3 and the right controller 4 to the above-described server via the network communication section 82 and the network, receives results (that is, game image data and game sound data) of the game control processing, the game image generation processing and the game sound generation processing that are executed by the server, and displays the game image on the display 12 and makes the game sound be output from the speaker 88. That is, it is possible to constitute an information processing system including the game system 1 shown in the above-described embodiment and the server on the network.

Moreover, although a case where the game image is displayed on the display 12 is described in the above-described embodiment, it does not need to be limited to this. The game image can also be displayed on a stationary monitor (for example, television monitor) by connecting the main body apparatus 2 to the stationary monitor via a cradle. In such a case, it is possible to constitute an information processing system including the game system 1 and the stationary monitor.

Furthermore, although the above-described embodiment is described on a case where the game system 1 having structure that the left controller 3 and the right controller 4 are attachable to or detachable from the main body apparatus 2 is used, it does not need to be limited to this. For example, it is possible to use an information processing apparatus such a game apparatus that an operation portion having operation buttons and analog sticks similar to those of the left controller 3 and the right controller 4 is provided integrally with the main body apparatus 2 or further electronic equipment capable of executing a game program. The further electronic equipment corresponds to smartphones, tablet PCs or the like. In such a case, an operation portion may constitute with software keys.

Moreover, in a further embodiment, the left controller 3 and the right controller 4 may be integrally constituted by coupling them using connecting members to each other to be used as a single controller.

Furthermore, specific numeral values and images shown in the above-described embodiment are mere examples and can be appropriately changed according to actual products.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer-readable storage medium having stored therein a program executable by a computer of an information processing apparatus, wherein the program, when executed, causes one or more processors of the computer to execute:
    based on input to the information processing apparatus, digging in a terrain object disposed in a virtual space;
    placing an object representing a flowable fluid in a dug portion of the terrain object;
    determining a shape of an area formed by the dug portion;
    controlling the object to flow based on determining that the shape of the area is elongated and controlling the object to not flow based on determining that the shape of the area is not elongated; and
    processing in accordance with whether the object is controlled to flow or to not flow.

2. The storage medium according to claim 1, wherein the terrain object is divided into sections and the determining of the shape comprises comparing a length parameter indicating a number of shortest sections related to two sections having a greatest number of the shortest sections connecting the two sections among the sections included in the area, with an area parameter indicating a number of the sections included in the area.

3. The storage medium according to claim 2, wherein the shape is determined to be elongated based on a square of the length parameter being greater than a reference value determined based on the area parameter.

4. The storage medium according to claim 2, wherein the shape is determined to be elongated based on a square of the length parameter being equal to or greater than a value obtained by quadrupling the area parameter.

5. The storage medium according to claim 1, wherein the flowable fluid comprises water, the area becomes a river area based on the object being controlled to flow, the area becomes a pond area based on the object being controlled to not flow, and the processing performs different processing for the river area and for the pond area.

6. The storage medium according to claim 5, wherein the processing includes processing that causes a character to perform fishing based on input to the information processing apparatus, and executes different processing for fishing in the river area and for fishing in the pond area.

7. The storage medium according to claim 1, wherein the terrain object is divided into sections and the controlling of the object comprises setting, in the sections in the area, at least a section rendered as a start point and a section rendered as an end point, calculating an outflow that is a flow out of the section rendered as the start point and an inflow that is a flow into the section rendered as the end point, and calculating directions of a flow in each of the sections in the area based on the outflow and the inflow.

8. The storage medium according to claim 2, wherein the controlling of the object comprises setting a start point to one section of two sections that the number of shortest sections connecting the two sections becomes the greatest number and an end point to another section of the two sections, calculating an outflow that is a flow out of the section set as the start point and an inflow that is a flow into the section set as the end point, and calculating a direction of a flow in each of the sections in the area based on the outflow and the inflow.

9. The storage medium according to claim 1, wherein the program causes the one or more processors to execute:

placing a fluid source object on the terrain, and
generating a flow of the flowable fluid using the fluid source object as a fluid source when the area is connected to the fluid source object, regardless of the shape of the area.

10. The storage medium according to claim 7, wherein the program causes the one or more processors to execute:
placing a fluid source object on the terrain, and
generating a flow of the flowable fluid using the fluid source object as a fluid source when the area is connected to the fluid source object, regardless of the shape of the area, the fluid source being rendered as the start point of the flow.

11. A game system comprising an input device and a control circuit, wherein the control circuit is configured to execute:
based on input to the input device of the game system, digging in a terrain object disposed in a virtual space;
placing an object representing a flowable fluid in a dug portion of the terrain object;
determining a shape of an area formed by the dug portion;
controlling the object to flow based on determining that the shape of the area is elongated and controlling the object to not flow based on determining that the shape of the area is not elongated; and
game processing including processing in accordance with whether the object is controlled to flow or to not flow.

12. The game system according to claim 11, wherein the terrain object is divided into sections and the determining of the shape comprises comparing a length parameter indicating a number of shortest sections related to two sections having a greatest number of the shortest sections connecting the two sections among the sections included in the area, with an area parameter indicating a number of the sections included in the area.

13. The game system according to claim 12, wherein the shape is determined to be elongated based on a square of the length parameter being greater than a reference value determined based on the area parameter.

14. The game system according to claim 12, wherein the shape is determined to be elongated based on a square of the length parameter being equal to or greater than a value obtained by quadrupling the area parameter.

15. The game system according to claim 11, wherein the flowable fluid comprises water, the area becomes a river area based on the object being controlled to flow, the area becomes a pond area based on the object being controlled to not flow, and the game processing performs different processing for the river area and for the pond area.

16. The game system according to claim 15, wherein the game processing includes processing that causes a character to perform fishing based on input to the information processing apparatus, and executes different processing for fishing in the river area and for fishing in the pond area.

17. The game system according to claim 11, wherein the controlling of the object comprises setting, in the sections in the area, at least a section rendered as a start point and a section rendered as an end point, calculating an outflow that is a flow out of the section rendered as the start point and an inflow that is a flow into the section rendered as the end point, and calculating directions of a flow in each of the sections in the area based on the outflow and the inflow.

18. The game system according to claim 12, wherein the controlling of the object comprises setting a start point to one section of two sections that the number of shortest sections connecting the two sections becomes the greatest number and an end point to another section of the two sections, calculating an outflow that is a flow out of the section set as the start point and an inflow that is a flow into the section set as the end point, and calculating a direction of a flow in each of the sections in the area based on the outflow and the inflow.

19. The game system according to claim 11, wherein the control circuit is configured to execute:
placing a fluid source object on the terrain, and
generating a flow of the flowable fluid using the fluid source object as a fluid source when the area is connected to the fluid source object regardless of the shape of the area.

20. The game system according to claim 17, wherein the control circuit is configured to execute:
placing a fluid source object on the terrain, and
generating a flow of the flowable fluid using the fluid source object as a fluid source when the area is connected to the fluid source object, regardless of the shape of the area, the fluid source being rendered as the start point of the flow.

21. A game apparatus comprising a control circuit, wherein the control circuit is configured to execute:
based on input to the game apparatus, digging in a terrain object disposed in a virtual space;
placing an object representing a flowable fluid in a dug portion of the terrain object;
determining a shape of an area formed by the dug portion;
controlling the object to flow based on determining that the shape of the area is elongated and controlling the object to not flow based on determining that the shape of the area is not elongated; and
game processing including processing in accordance with whether the object is controlled to flow or to not flow.

22. A game controlling method, comprising:
based on input by a player, digging in a terrain object disposed in a virtual space;
placing an object representing a flowable fluid in a dug portion of the terrain object;
determining a shape of an area formed by the dug portion;
controlling the object to flow based on determining that the shape of the area is elongated and controlling the object to not flow based on determining that the shape of the area is not elongated; and
game processing including processing in accordance with whether the object is controlled to flow or to not flow.

* * * * *